US011975351B2

(12) United States Patent
Groene et al.

(10) Patent No.: US 11,975,351 B2
(45) Date of Patent: May 7, 2024

(54) SYSTEM AND METHOD FOR DISPENSER CONTROL

(71) Applicant: NORDSON CORPORATION, Westlake, OH (US)

(72) Inventors: Jeff Groene, Coventry, RI (US); Richard Murphy, Norton, MA (US); Robert Carvahlo, Bristol, RI (US)

(73) Assignee: Nordson Corporation, Westlake, OH (US)

( * ) Notice: Subject to any disclaimer, the term of this patent is extended or adjusted under 35 U.S.C. 154(b) by 373 days.

(21) Appl. No.: 17/424,530

(22) PCT Filed: Jan. 21, 2020

(86) PCT No.: PCT/US2020/014319

§ 371 (c)(1),
(2) Date: Jul. 21, 2021

(87) PCT Pub. No.: WO2020/154242

PCT Pub. Date: Jul. 30, 2020

(65) Prior Publication Data

US 2022/0072580 A1 Mar. 10, 2022

Related U.S. Application Data

(60) Provisional application No. 62/794,914, filed on Jan. 21, 2019.

(51) Int. Cl.

*B05C 11/10* (2006.01)
*B05B 1/08* (2006.01)

(Continued)

(52) U.S. Cl.

CPC .......... *B05C 11/1034* (2013.01); *B05B 1/083* (2013.01); *B05B 12/004* (2013.01); *B05C 5/0225* (2013.01)

(58) Field of Classification Search

CPC ............... B05C 11/1034; B05C 5/0225; B05C 11/1002; B05C 5/02; B05B 1/083; B05B 12/004

See application file for complete search history.

(56) References Cited

U.S. PATENT DOCUMENTS 5,273,187 A 12/1993 Suzuki
5,656,339 A * 8/1997 Wesseling ........... H01L 21/6715 239/102.1

(Continued)

FOREIGN PATENT DOCUMENTS

CN 1395509 A 2/2003
CN 1674217 A 9/2005

(Continued)

OTHER PUBLICATIONS

The International Search Report (ISA210) and Written Opinion (ISA237) of the ISA, dated May 26, 2020, for WO Application No. PCT/US20/014319.

*Primary Examiner* — Donnell A Long
(74) *Attorney, Agent, or Firm* — BakerHostetler

(57) ABSTRACT

Applicators and methods for dispensing material are disclosed. The applicator includes a syringe defining an inlet, and outlet, a chamber extending from the inlet to the outlet, a plunger disposed within the chamber, and a piston attached to the plunger, where the piston is configured to move the plunger through the chamber. The applicator also includes an actuation mechanism configured to linearly translate the piston through the chamber so as to dispense material through the outlet, a sensor attached to the plunger, where the sensor is configured to sense a linear movement of the plunger, and a controller configured to adjust operation of the actuation mechanism based on the linear movement sensed by the sensor such that the piston repeatedly dis- (Continued)

penses a predetermined amount of the material from the outlet of the syringe over a plurality of dispense cycles.

20 Claims, 18 Drawing Sheets

(51) Int. Cl.
*B05B 12/00* (2018.01)
*B05C 5/02* (2006.01)

(56) References Cited

U.S. PATENT DOCUMENTS

| | | | |
|---|---|---|---|
| 6,514,569 B1 | 2/2003 | Crouch | |
| 2002/0128594 A1 | 9/2002 | Das et al. | |
| 2003/0132243 A1 | 7/2003 | Engel | |
| 2011/0028897 A1 | 2/2011 | Swan et al. | |
| 2013/0026198 A1* | 1/2013 | Felix | B05C 11/10 222/504 |
| 2014/0076923 A1* | 3/2014 | Clark | B05C 11/1042 73/304 C |
| 2014/0138399 A1 | 5/2014 | Estelle | |
| 2014/0157731 A1 | 6/2014 | Perazzo et al. | |
| 2016/0097385 A1 | 4/2016 | Estelle | |
| 2018/0311697 A1 | 11/2018 | MacIndoe et al. | |
| 2018/0333527 A1 | 11/2018 | Wen et al. | |

FOREIGN PATENT DOCUMENTS

| | | | | |
|---|---|---|---|---|
| CN | 102989638 A | 3/2013 | |
| CN | 103170436 A | 6/2013 | |
| CN | 106583166 A | 4/2017 | |
| GB | 2309684 A * | 8/1997 | B05C 11/101 |
| JP | 2006-035149 A | 2/2006 | |
| JP | 2010-527255 A | 8/2010 | |
| JP | 2014-113588 A | 6/2014 | |
| JP | 2016-215198 A | 12/2016 | |
| WO | 2016/138018 A2 | 9/2016 | |
| WO | 2017/202985 A1 | 11/2017 | |

* cited by examiner

SYSTEM AND METHOD FOR DISPENSER CONTROL

CROSS REFERENCE TO RELATED APPLICATIONS

This application is a National Stage Application of International Patent App. No. PCT/US2020/014319, filed Jan. 21, 2020, which claims the benefit of U.S. Provisional Patent App. No. 62/794,914, filed Jan. 21, 2019, the entire disclosures of both of which are hereby incorporated by reference as if set forth in their entirety herein.

TECHNICAL FIELD

This disclosure generally relates to fluid applicators, and more particularly to fluid applicators configured to ensure a predetermined amount of liquid is repeatedly dispensed.

BACKGROUND

Known applicators for jetting fluid materials such as adhesives, solder paste, conformal coatings, encapsulants, underfill material, and surface mount adhesives generally operate to jet small volumes of fluid material onto a substrate by reciprocating a needle. Such materials can be stored in a syringe comprising a portion of the applicator, where a predetermined amount of the material is intermittently dispensed from the syringe to valve assembly of the applicator, which then jets the material from the applicator. Providing a consistent amount of the material to the valve assembly is one of the most important aspects of automated fluid dispensing, as inconsistencies in the amount of material dispensed can lead to wasted material and unsalable end products.

Current methods of ensuring a consistent amount of material is dispensed from a syringe can be costly, cumbersome, and/or ineffective. For example, a jetting process can be interrupted and the mass of an amount of the jetted material can be measured. However, this method is time consuming, expensive, and disruptive to the overall manufacturing process. Additionally, jetted amounts of material can be analyzed through vision system analysis, which can be expensive and difficult to set up and calibrate. Further, jetted amounts of material can be monitored through volumetric dispensing, which can slow down the overall jetting process. Another method of monitoring material dispensing amounts is through anticipatorily changing the amount of material dispensed by accounting for expected changes. However, this method requires unique and time-consuming characterization of the material and other aspects of the jetting system.

Further, a system for ensuring that a consistent amount of material is dispensed from an applicator syringe should be able to account for various causes of inconsistent dispensing amounts, as many factors can affect dispensing volume and mass during the course of dispensing material from a syringe. For example, the time required to pressurize and de-pressurize a syringe increases as the syringe empties. Variations in the temperature of the jetting system can affect the material's resistance to flow, which can change dispensing size. Certain types of material will change viscosity over time, due to factors such as curing, for example. Also, material characteristics may vary from one batch of material to the next. These factors, in addition to a plurality of others, must be accounted for when attempting to control the dispensing of material from a syringe.

As a result, there is a need for an applicator that dispenses a consistent amount of material repeatedly and reliably accounts for any change that could affect material dispensing.

SUMMARY

An embodiment of the present disclosure is an applicator for dispensing material, including a syringe defining an inlet, and outlet, a chamber extending from the inlet to the outlet, a plunger disposed within the chamber, and a piston attached to the plunger, where the piston is configured to move the plunger through the chamber. The applicator also includes an actuation mechanism configured to linearly translate the piston through the chamber so as to dispense material through the outlet, a sensor attached to the plunger, where the sensor is configured to sense a linear movement of the plunger, and a controller configured to adjust operation of the actuation mechanism based on the linear movement sensed by the sensor such that the piston repeatedly dispenses a predetermined amount of the material from the outlet of the syringe over a plurality of dispense cycles.

Another embodiment of the present disclosure is a method of dispensing material from a syringe, including operating an actuation mechanism to linearly translate a piston and a plunger attached thereto through a chamber of the syringe so as to dispense material through an outlet of the syringe, and sensing a linear movement of the plunger via a sensor. The method also includes adjusting operation of the actuation mechanism based on the linear movement sensed by the sensor such that the piston repeatedly dispenses a predetermined amount of the material from the outlet of the syringe over a plurality of dispense cycles.

BRIEF DESCRIPTION OF THE DRAWINGS

The foregoing summary, as well as the following detailed description, will be better understood when read in conjunction with the appended drawings. The drawings show illustrative embodiments of the disclosure. It should be understood, however, that the application is not limited to the precise arrangements and instrumentalities shown.

DETAILED DESCRIPTION OF ILLUSTRATIVE EMBODIMENTS

Figure 1:
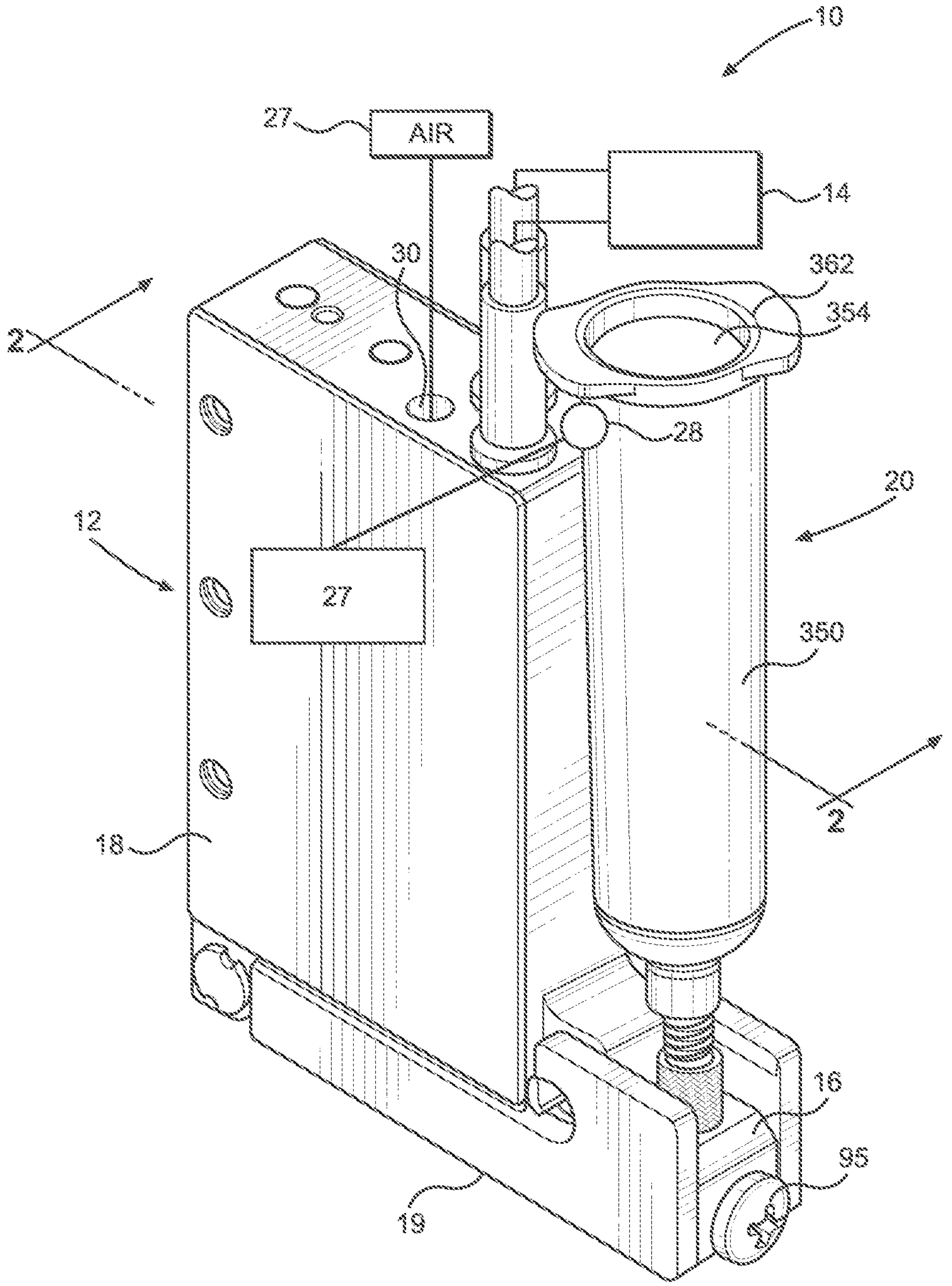
FIG. 1 is a perspective view of an applicator according to an illustrative embodiment of the invention.

Referring to FIGS. 1-4, an applicator 10 in accordance with an embodiment of the invention generally comprises a jetting dispenser 12 coupled with a controller 14. The jetting dispenser 12 includes a fluid body 16 coupled to an actuator housing 18. More specifically, the fluid body 16 is held within a fluid body housing 19, which may include one or more heaters (not shown), depending on the needs of the jetting operation. The fluid body 16 receives material under pressure from a syringe 20 (discussed in further detail below). A valve assembly 22 is coupled to the actuator housing 18 and extends into the fluid body 16. A mechanical amplifier (e.g., a lever 24) is coupled between a piezoelectric device 26 and the valve assembly 22, as will be described further below.

Figure 2:
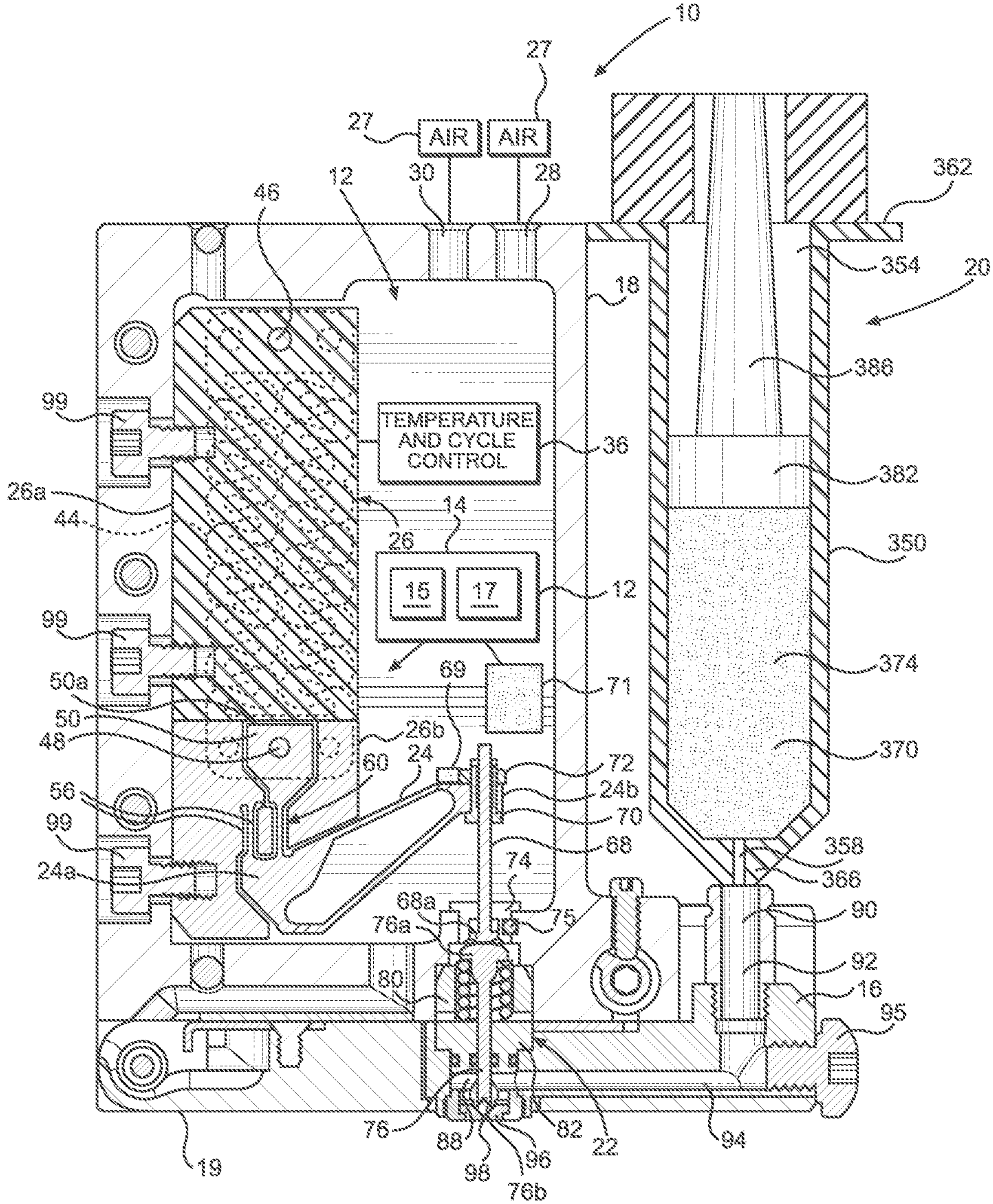
FIG. 2 is a cross sectional view of the applicator shown in FIG. 1, taken along line 2-2 of FIG. 1.

For purposes of cooling the piezoelectric device 26, air may be introduced from a source 27 into an inlet port 28 and out from an exhaust port 30. Alternatively, depending on the cooling needs, both of the inlet and exhaust ports 28, 30 may receive cooling air from the source 27 as shown in FIG. 2. In such a case, one or more other exhaust ports (not shown) would be provided in the actuator housing 18. A temperature and cycle control 36 is provided for cycling the piezoelectric device 26 during a jetting operation, and for controlling one or more heaters (not shown) carried by the jetting dispenser 12 for maintaining the dispensed materials at a required temperature. As another option, the temperature and cycle control 36, or another control, may control the cooling needs of the piezoelectric device 26 in a closed loop manner. As further shown in FIG. 4, the piezoelectric device 26 further comprises a stack 40 of piezoelectric elements. This stack 40 is maintained in compression by respective flat compression spring elements 42, 44 coupled on opposite sides of the stack 40. More specifically, upper and lower pins 46, 48 are provided that hold the flat spring elements 42, 44 to one another with the stack 40 of piezoelectric elements therebetween. The upper pin 46 is held within an upper actuator portion 26*a* of the piezoelectric device 26, while a lower pin 48 directly or indirectly engages a lower end of the stack 40. The upper actuator portion 26*a* securely contains the stack 40 of piezoelectric elements so that the stack 40 is stabilized against any sideward motion. In this embodiment, the lower pin 48 is coupled to a lower actuator portion 26*b* and, more specifically, to a mechanical armature 50 (FIG. 2).

An upper surface 50*a* of the mechanical armature 50 bears against the lower end of the piezoelectric stack 40. The spring elements 42, 44 are stretched between the pins 46, 48 such that the spring elements 42, 44 apply constant compression to the stack 40 as shown by the arrows 53 in FIG. 4. The flat spring elements 42, 44 may, more specifically, be formed from a wire EDM process. The upper end of the piezoelectric element stack 40 is retained against an internal surface of the upper actuator portion 26*a*. The upper pin 46 is therefore stationary while the lower pin 48 floats or moves with the spring elements 42, 44 and with the mechanical armature 50 as will be described. When a voltage waveform is applied to the piezoelectric stack 40, the stack 40 expands or lengthens and this moves the mechanical armature 50 downward against the force of the spring elements 42, 44. The stack 40 will change length proportional to the magnitude of the applied voltage waveform over time.

As further shown in FIG. 2, the mechanical armature 50 is operatively coupled with a mechanical amplifier which, in this illustrative embodiment, is formed as the lever 24 coupled to the mechanical armature 50 generally near a first end 24*a* and coupled to a push rod 68 at a second end 24*b*. The lever 24 may be integrally formed from the lower actuator portion 26*b* through, for example, an EDM process that also forms a series of slots 56 between the mechanical armature 50 and the lever 24. As will be further discussed below, the lever 24 or another mechanical amplifier amplifies the distance that the stack 40 expands or lengthens by a desired amount. For example, in this embodiment, downward movement of the stack 40 and the mechanical armature 50 is amplified by about eight times at the second end 24*b* of the lever 24.

Now referring more specifically to FIGS. 2, 2A, 2B and 5, a flexural portion 60 couples the lever 24 to the mechanical armature 50. As shown best in FIG. 5, the lever 24 pivots about a pivot point 62 that is approximately at the same horizontal level as the second end 24*b* of the lever 24. This position of the pivot point 62 serves to minimize the effect of the arc through which the lever 24 rotates. The series of slots 56 is formed in the lower actuator portion 26*b* form the flexural portion 60. When the piezoelectric stack 40 lengthens under the application of a voltage waveform by the controller 14 as shown by the arrow 66 in FIG. 5, the lever 24 rotates clockwise generally about the pivot point 62 as the stack 40 pushes downward on the mechanical armature 50. The slight rotation of the lever 24 takes place against a resilient bias applied by the flexural portion 60. As the second end 24*b* is rotating slightly clockwise about the pivot point 62, it moves downward and likewise moves an attached push rod 68 downward (FIG. 2) as indicated by the arrow 67 in FIG. 5.

The controller 14 can comprise any suitable computing device configured to host a software application for monitoring and controlling various operations of the applicator 10 as described herein. It will be understood that the controller 14 can include any appropriate computing device, examples of which include a processor, a desktop computing device, a server computing device, or a portable computing device, such as a laptop, tablet, or smart phone. Specifically, the controller 14 can include a memory 15 and a human-machine interface (HMI) device 17. The memory 15 can be volatile (such as some types of RAM), non-volatile (such as ROM, flash memory, etc.), or a combination thereof. The controller 14 can include additional storage (e.g., removable storage and/or non-removable storage) including, but not limited to, tape, flash memory, smart cards, CD-ROM, digital versatile disks (DVD) or other optical storage, magnetic tape, magnetic disk storage or other magnetic storage devices, universal serial bus (USB) compatible memory, or any other medium which can be used to store information and which can be accessed by the controller 14. The HMI device 17 can include inputs that provide the ability to control the controller 14, via, for example, buttons, soft keys, a mouse, voice actuated controls, a touch screen, movement of the controller 14, visual cues (e.g., moving a hand in front of a camera on the controller 14), or the like. The HMI device 17 can provide outputs, via a graphical user interface, including visual information, such as the visual indication of the current position and velocity values of the needle 76, as well as acceptable ranges for these parameters via a display. Other outputs can include audio information (e.g., via speaker), mechanically (e.g., via a vibrating mechanism), or a combination thereof. In various configurations, the HMI device 17 can include a display, a touch screen, a keyboard, a mouse, a motion detector, a speaker, a microphone, a camera, or any combination thereof. The HMI device 17 can further include any suitable device for inputting biometric information, such as, for example, fingerprint information, retinal information, voice information, and/or facial characteristic information, for instance, so as to require specific biometric information for accessing the controller 14.

Figure 2B:
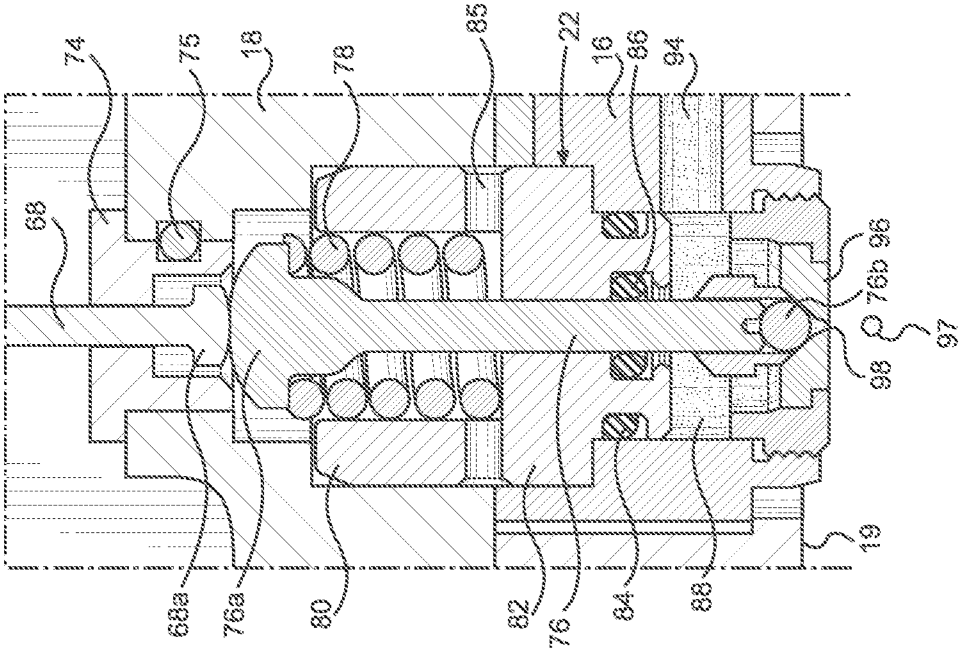
FIG. 2B is an enlarged cross sectional view of the valve assembly shown in FIG. 2A, with the needle in a second position.
Figure 2A:
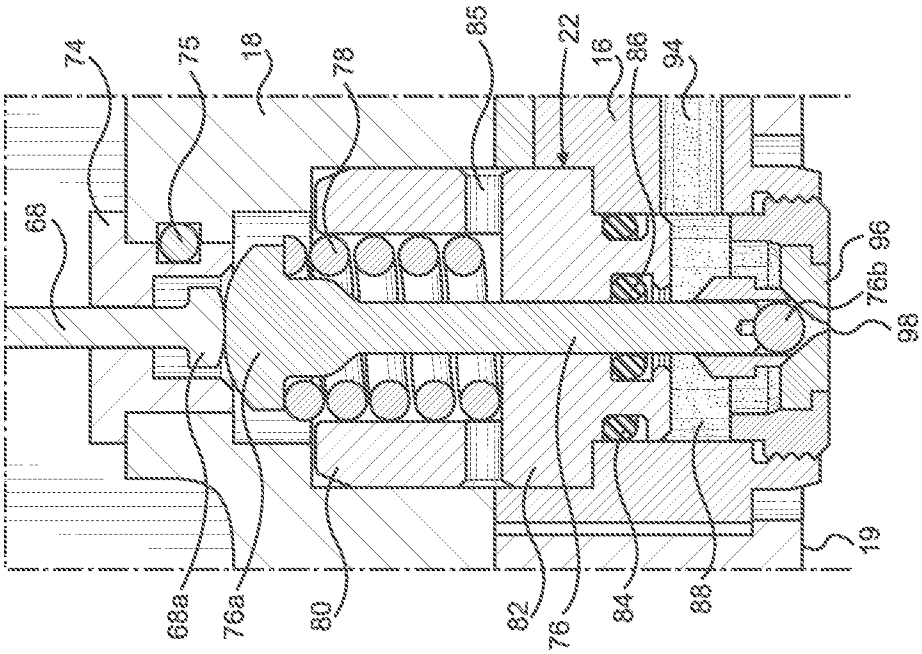
FIG. 2A is an enlarged cross sectional view of the valve assembly of the applicator shown in FIG. 2, showing the needle in a first position.

The second end **24*b* of the lever 24 is fixed to the push rod 68 using suitable threaded fasteners 70, 72. The push rod 68 has a lower head portion 68*a* that travels within a guide bushing 74 and bears against an upper head portion 76*a* of a needle 76 of the valve assembly 22. The guide bushing 74 is held in the actuator housing 18 by a press fit with a pin 75 as best seen in FIGS. 2A and 2B. The assembly of the push rod 68, guide bushing 74 and pin 75 allows for some "give" to ensure proper movement of the push rod 68 during operation. In addition, the push rod 68 is made of a material that will slightly bend sideward, in an elastic manner, during its reciprocating movement with the needle 76 and lever 24. The valve assembly 22 further comprises a coil spring 78 which is mounted within a lower portion of the actuator housing 18 using an annular element 80. The valve assembly 22 further comprises an insert 82 retained in the fluid body 16 by an O-ring 84. The annular element 80 and the insert 82 comprise an integral element, i.e., a cartridge body in this embodiment. A cross-drilled weep hole 85 is approximately in line with the lower end of the coil spring 78 to allow any liquid that leaks past the O-ring 86 to escape. An additional O-ring 86 seals the tappet or needle 76 such that pressurized material contained in a fluid bore 88 of the fluid body 16 does not leak out. Material is supplied to the fluid bore 88 from the syringe 20 through an inlet 90 of the fluid body 16 and fluid passages 92, 94. The O-ring 84 seals the outside of the cartridge body formed by the annular element 80 and insert 82 from the pressurized liquid in fluid bore 88 and passage 94. The fluid passages 92, 94 are scaled by a plug member 95 threaded into the fluid body 16. The plug member 95 may be removed to allow access for cleaning the internal passage 94**.

Referring to FIGS. 2 and 3-5, the applicator 10 can include a reference component 69 attached to the lever 24 near the second end **24*b*, as well as a position sensor 71 disposed within the actuator housing 18. The position sensor 71 is configured to detect and monitor the position of the reference component 69 as the lever 24 pivots upon lengthening and contraction of the piezoelectric stack 40. The position sensor 71 is in electronic communication with the controller 14, and can continuously or periodically monitor and communicate the position of the reference component 69 to the controller 14. By monitoring the position of the reference component 69, the position sensor 71 also monitors the position of the lever 24 to which the reference component 69 is attached during a dispensing operation. In one embodiment, the reference component 69 is a magnet and the position sensor 71 is a Hall effect sensor, though other configurations are also contemplated. Also, although the reference component 69 is depicted as attached to the lever 24, the reference component 69 can be attached to any of the lever 24, the push rod 68, or the needle 76. The lever 24, push rod 68, and the needle 76 can collectively be referred to as the "moving parts" of the actuator. As the reference component 69 can be differently positioned, the position sensor 71 can similarly be repositioned within the actuator housing 18 so as to best monitor the position of the reference component 69. The method for using the position sensor 71 and reference component 69 to control the applicator 10** will be described further below.

Figure 3:
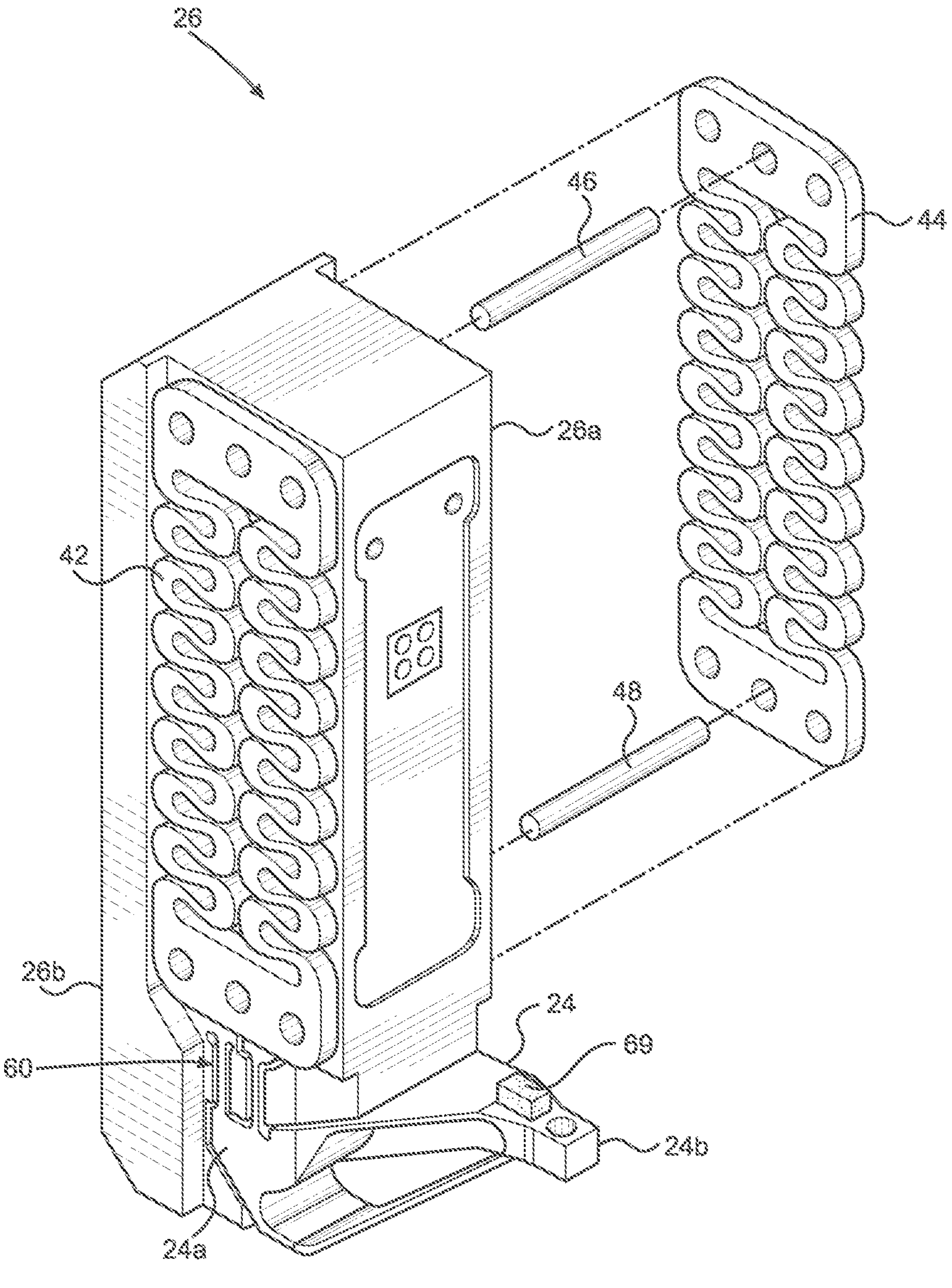
FIG. 3 is a partially exploded perspective view of a piezoelectric device of the applicator shown in FIG. 1.
Figure 4:
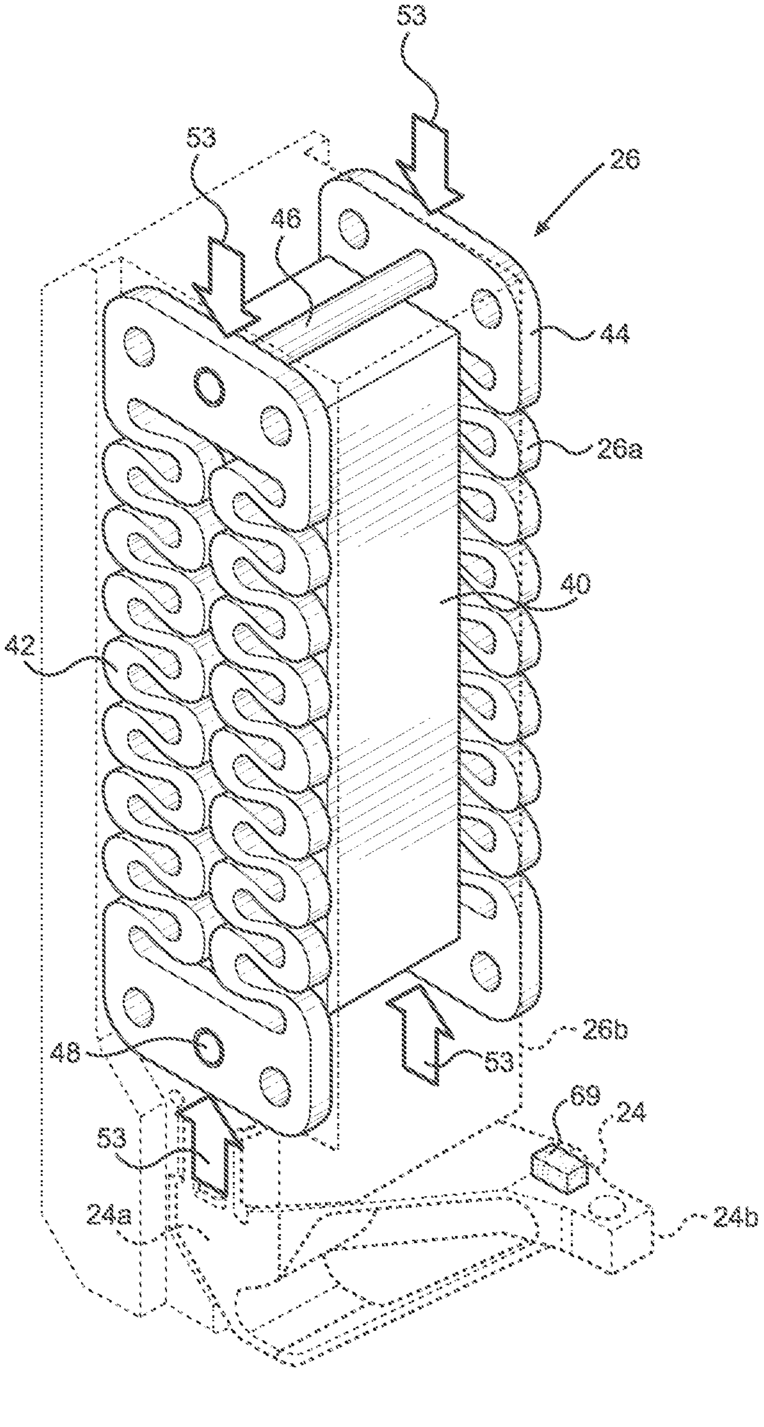
FIG. 4 is a perspective view of the piezoelectric device shown in FIG. 3, with certain elements shown in dashed lines to better show inner details.
Figure 5:
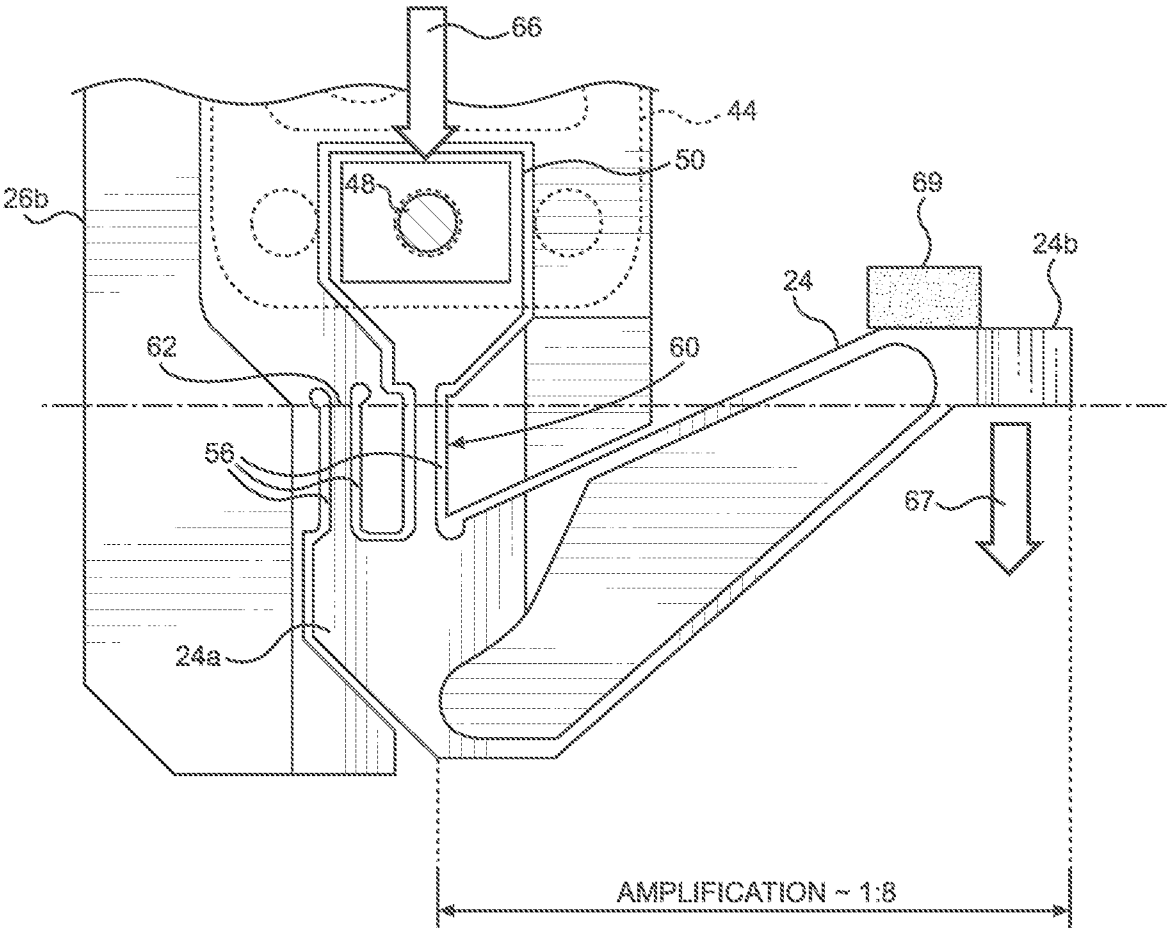
FIG. 5 is a side elevational view of a lower portion of the piezoelectric device shown in FIG. 3.
Figure 6:
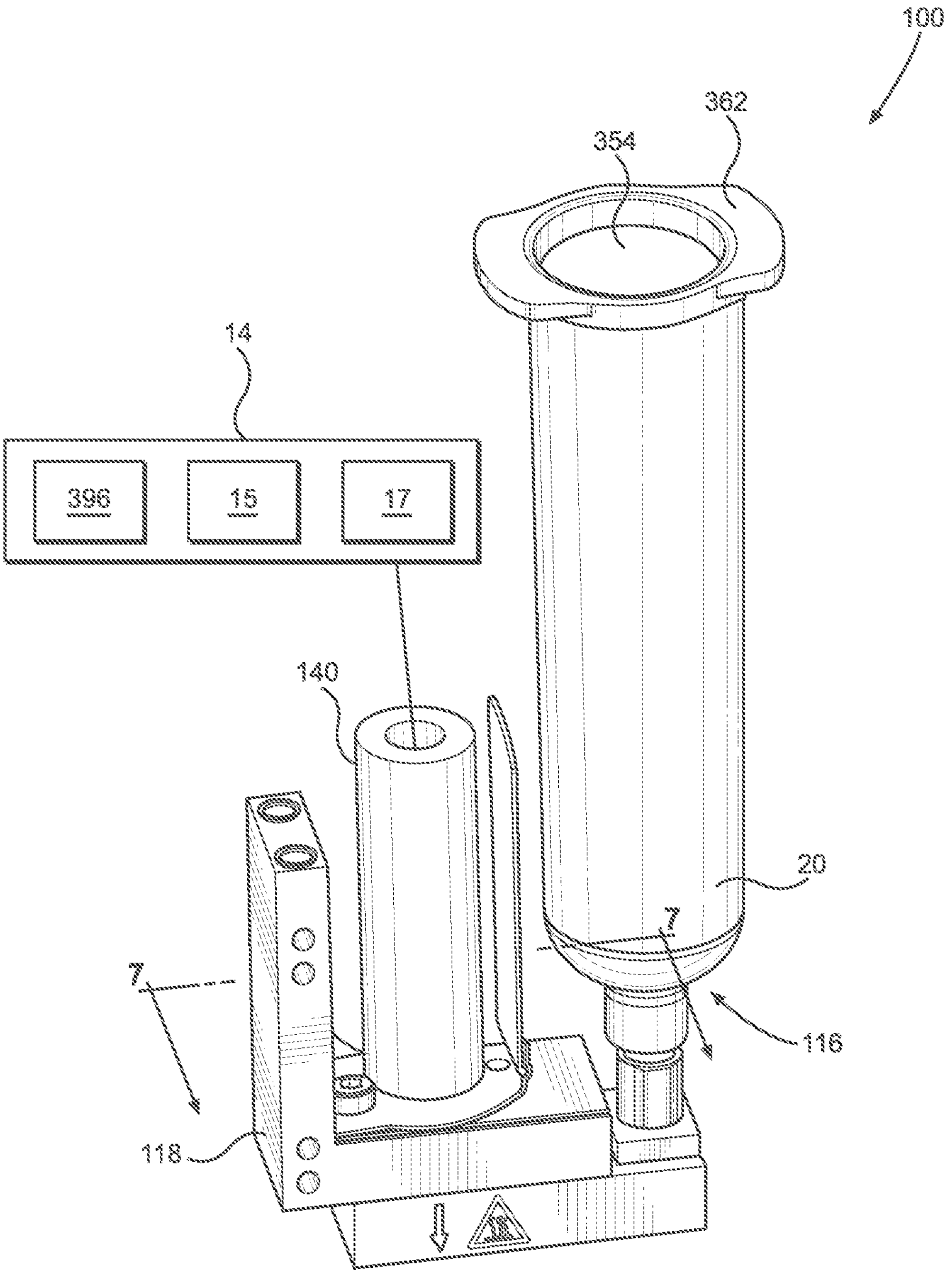
FIG. 6 is an isometric view of an applicator according to an alternative embodiment of the present disclosure.

The operation of the applicator 10 to jet droplets or small amounts of material will be best understood by reviewing FIGS. 2-4. FIG. 2A illustrates the needle 76 raised to a retracted first position when the voltage waveform to the piezoelectric stack 40 has been sufficiently removed. This causes the stack 40 to contract. As the stack 40 contracts, the flat spring elements 42, 44 pull the mechanical armature 50 upward and this raises the second end **24*b* of the lever 24, and also raises the push rod 68. Thus, the coil spring 78 of the valve assembly 22 can then push upward on the upper head portion 76*a* of the needle 76 and raise a distal end 76*b* of the needle 76 off a valve seat 96 affixed to the fluid body 16. In this position, the fluid bore 88 and the area beneath the distal end 76*b* of the needle 76 fills with additional material to "charge" the jetting dispenser 12 and prepare the jetting dispenser 12** for the next jetting cycle.

When the piezoelectric stack 40 is activated, i.e., when a voltage waveform is applied to the piezoelectric stack 40 by the controller 14 (FIG. 1), the stack 40 expands and pushes against the mechanical armature 50. This rotates the lever 24 clockwise and moves the second end **24*b* downward, also moving the push rod 68 downward. The lower head portion 68*a* of the push rod 68 pushes down on the upper head portion 76*a* of the needle 76 as shown in FIG. 2B and the needle 76 moves quickly downward against the force of the coil spring 78 until the distal end 76*b* engages against the valve seat 96 in a second position. In the process of movement, the distal end 76*b* of the needle 76 forces a droplet 97 of material from a discharge outlet 98. Voltage is then removed from the piezoelectric stack 40 and this reverses the movements of each of these components to raise the needle 76** for the next jetting cycle.

It will be appreciated that the piezoelectric device 26 may be utilized in reverse to jet droplets. In this case, the various mechanical actuation structures including the lever 24 would be designed differently such that when the voltage is removed from the piezoelectric stack 40, the resulting contraction of the stack 40 will cause movement of the needle 76 toward the valve seat 96 and the discharge outlet 104 to discharge a droplet 97 of material. Then, upon application of the voltage waveform to the stack 40, the amplification system and other actuation components would raise the needle 76 in order to charge the fluid bore 88 with additional material for the next jetting operation. In this embodiment, the needle 76 would be normally closed, that is, it would be engaging the valve seat 96 when there is no voltage applied to the piezoelectric stack 40.

As further shown in FIG. 2, the upper actuator portion 26*a* is separate from the lower actuator portion 26*b* and these respective portions 26*a*, 26*b* are formed from different materials. Specifically, the upper actuator portion 26*a* is formed from a material having a lower coefficient of thermal expansion than the material forming the lower actuator portion 26*b*. Each of the upper and lower actuator portions 26*a*, 26*b* is securely fastened together using threaded fasteners (not shown) extending from the lower actuator portion 26*b* into the upper actuator portion 26*a*. The assembly of the upper and lower actuator portions 26*a*, 26*b* is then fastened to the housing by a plurality of bolts 99. More specifically, the lower actuator portion 26*b* may be formed from 17-4 PH stainless steel, while the upper actuator portion 26*a* may be formed from a nickel-iron alloy, such as Invar. 17-4 PH stainless steel has a very high endurance limit, or fatigue strength, which increases the life of flexural portion 60. The coefficient of thermal expansion of this stainless steel is about 10 μm/m-C, while the coefficient of thermal expansion of Invar is about 1 μm/m-C. The ratio of the thermal expansions may be higher or lower than the approximate 10:1 ratio of these materials. The coefficients of thermal expansion associated with the upper and lower actuator portions 26*a*, 26*b* effectively provide offsetting characteristics to each other. The differing coefficients of thermal expansion of the upper and lower actuator portions 26*a*, 26*b* thereby allow the piezoelectric device 26 to operate consistently across a wider temperature range. Specifically, this temperature range allows the piezoelectric device 26 to be run at higher frequencies and with more aggressive waveforms. Also, piezo stacks, when operated at a high duty cycle, can generate significant heat. Use of Invar provides for more absolute positioning of the end of the piezoelectric device 26, and hence more accurate and useable stroke.

Referring to FIGS. 6-14, another embodiment of an applicator for jetting a material onto a substrate is shown. The applicator 100 is shown having a fluid body 116 coupled to an actuator housing 118. The fluid body 116 is held within a fluid body housing 119, which may include one or more heaters (not shown), depending on the needs of the application. The fluid body 116 is configured to receive material under pressure from a syringe 20, as will be discussed further below. A valve assembly 122 is coupled to the actuator housing 118 and extends into the fluid body 116. A mechanical amplifier 206 is coupled between a piezoelectric device 126 and the valve assembly 122, as will be described further below. The piezoelectric device 126 may be fastened to the actuator housing 118 by a plurality of bolts (not shown) or other suitable fasteners. The piezoelectric device 126 may include various materials, for example, but not limited to, stainless steel or a nickel-iron alloy.

Figure 7:
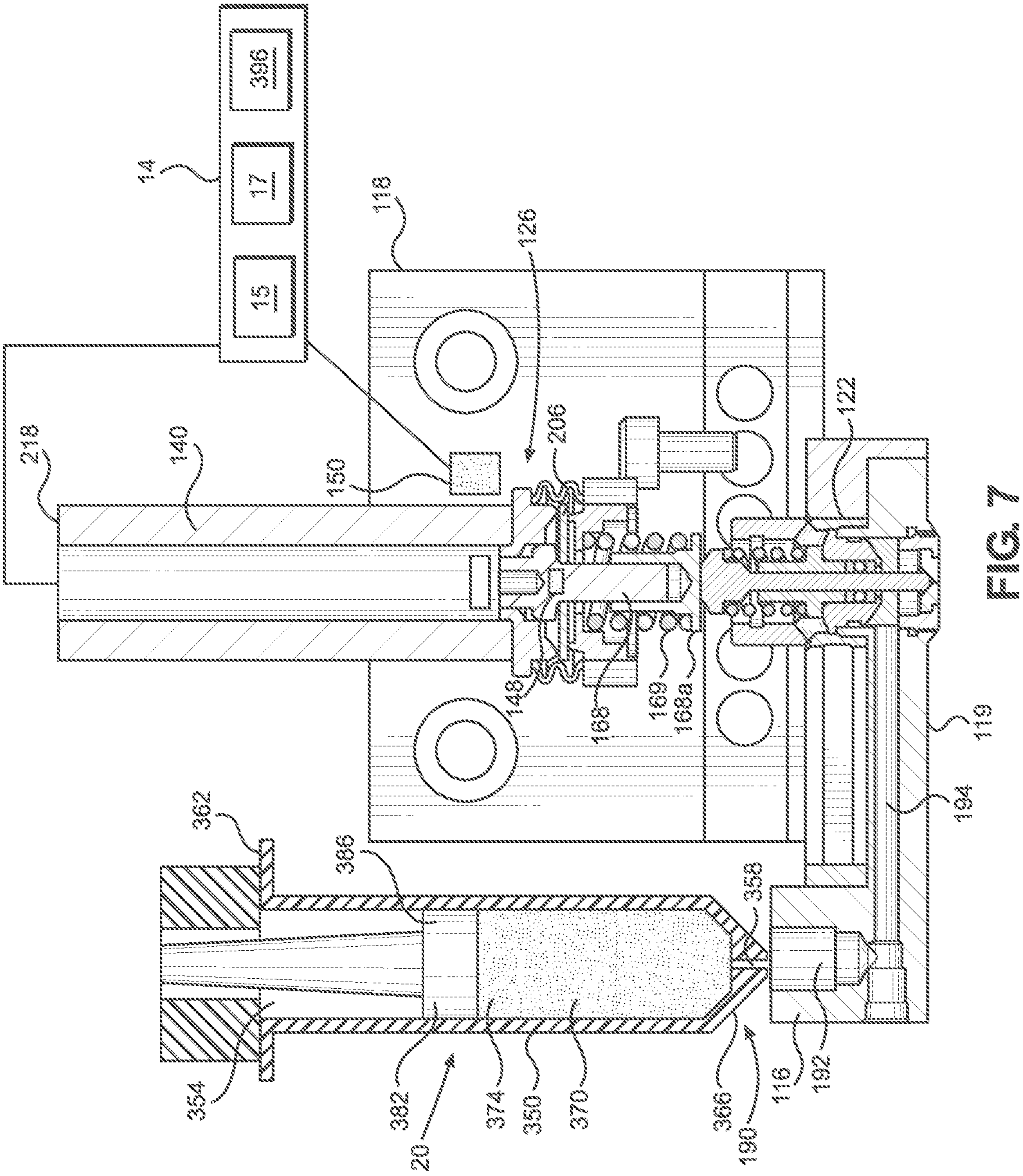
FIG. 7 is a cross sectional view of a portion of the applicator shown in FIG. 6, taken along line 7-7 of FIG. 6.
Figure 8:
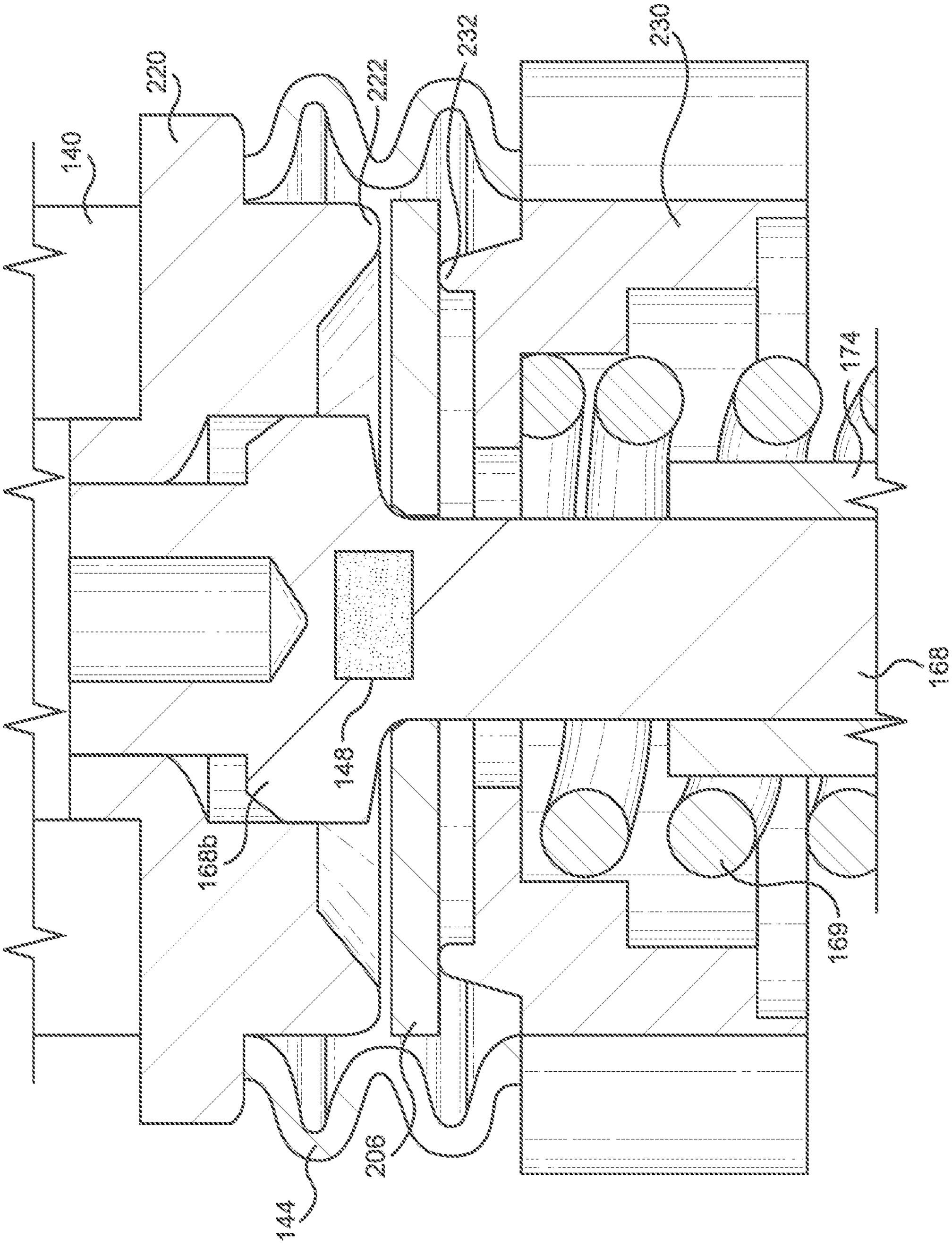
FIG. 8 is an enlarged portion of the cross sectional view of the applicator shown in FIG. 7.

As further shown in FIGS. 7-8, the piezoelectric device 126 includes a stack 140 of piezoelectric elements, a proximal end 218, and a distal end 220 opposite the proximal end 218. The piezoelectric elements are configured to deform upon application and/or removal of a voltage waveform. This stack 140 is maintained in compression by a compression spring 144 coupled to the piezoelectric device 126.

The stack 140 may be held in compression between the compression spring 144 at the distal end 220 and a rigid surface (not shown), for example, against an internal surface of the actuator housing 18. The rigid surface may contact the proximal end 218. In some aspects, the stack 140 may be held by a plurality of compression springs 144, for example, a first compression spring 144 at the proximal end 218 and a second compression spring 144 at the distal end 220.

Figure 9A:
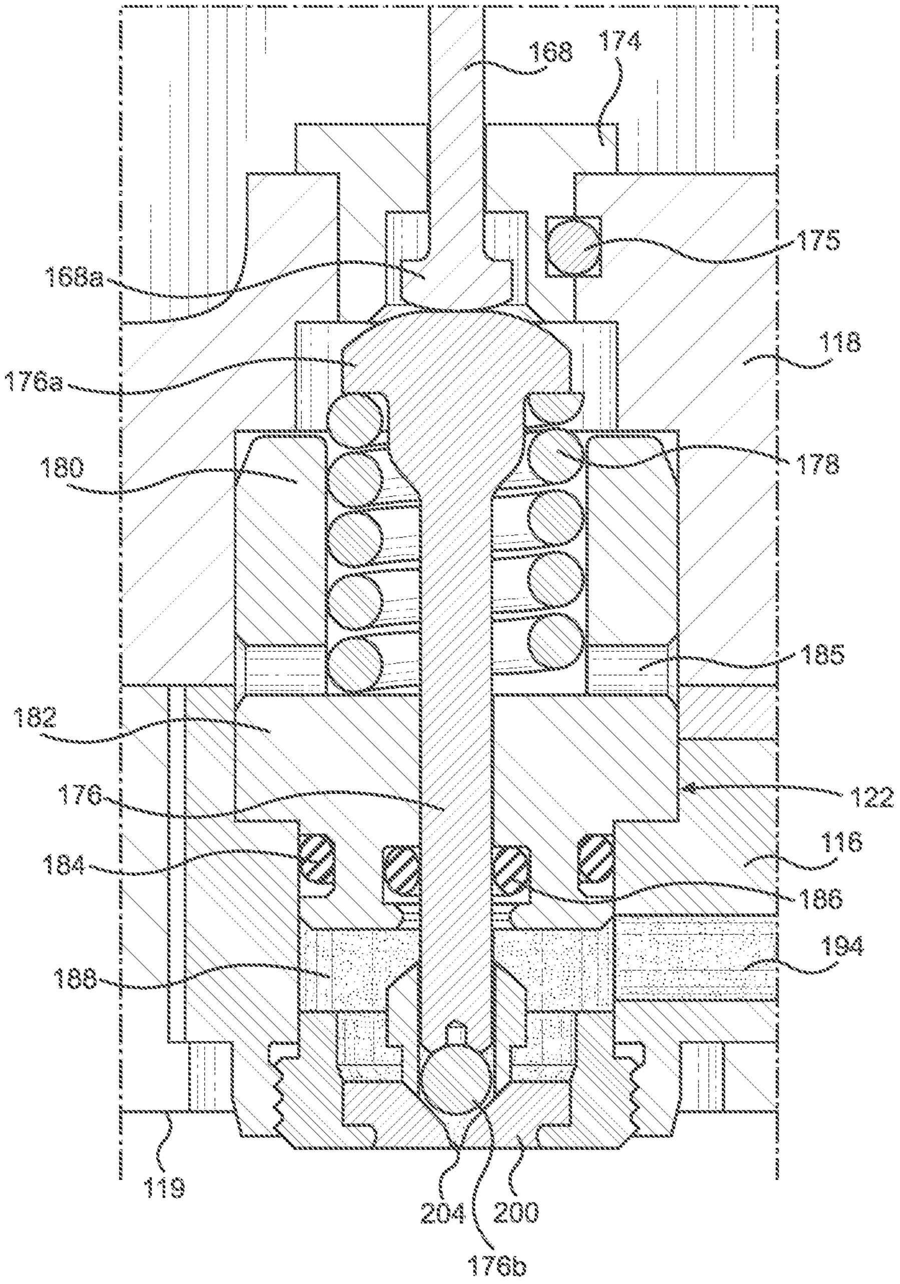
FIG. 9A is an enlarged portion of the cross sectional view of a valve assembly of the applicator shown in FIG. 6, with a needle in a first position.
Figure 9B:
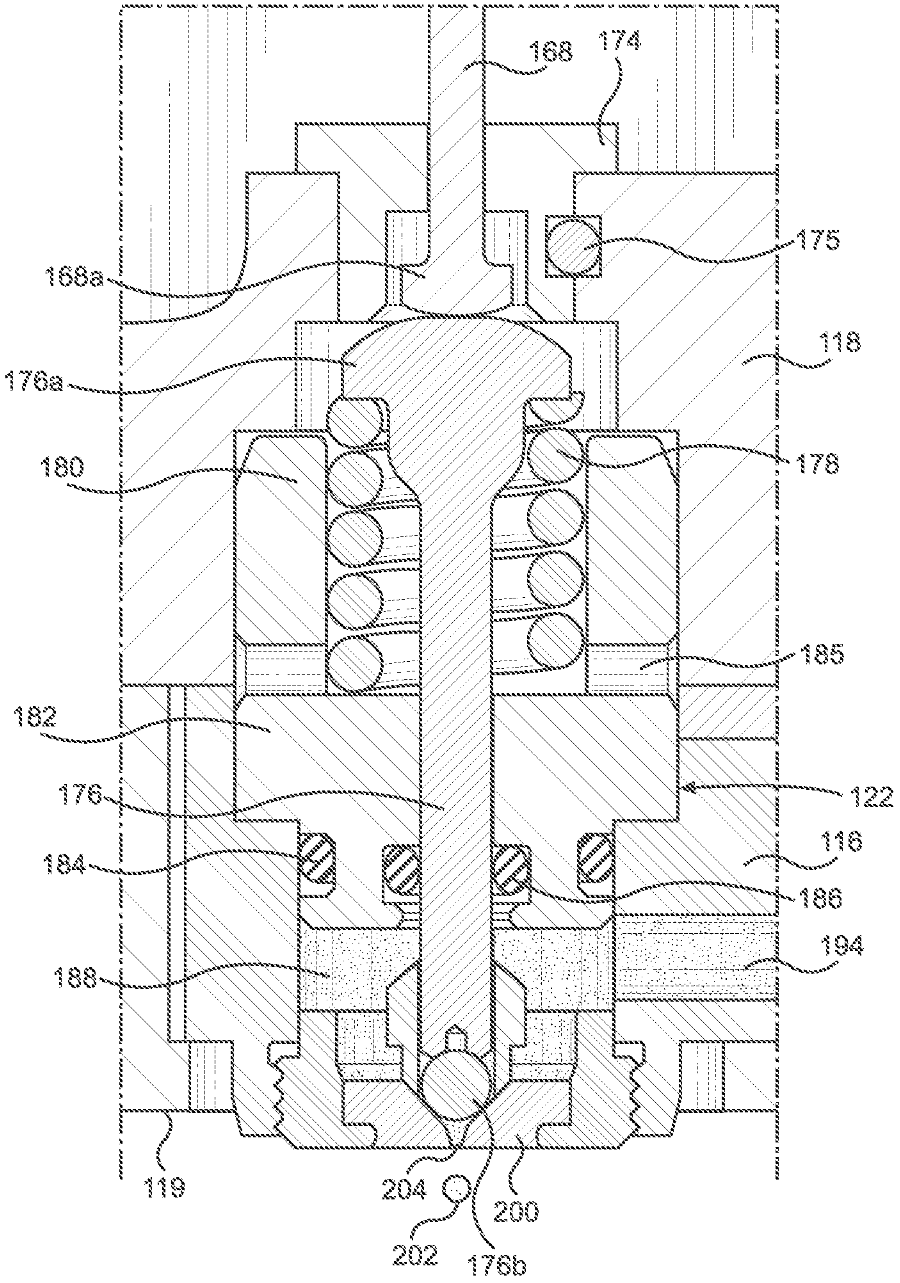
FIG. 9B is an enlarged cross sectional view of the valve assembly shown in FIG. 9A, with the needle in a second position.

The piezoelectric device 126 is operatively engaged with a push rod 168 and is configured to move the push rod 168 in a first direction. Referring to FIGS. 9A-9B, the push rod 168 has a lower head portion 168*a* that travels within a guide bushing 174 and bears against a proximal end 176*a* of a needle 176 associated with the valve assembly 122, wherein the needle 176 may be a movable shaft. The guide bushing 174 may be held in the actuator housing 118 by a press fit with a pin 175. The assembly of the push rod 168, guide bushing 174 and pin 175 allows for some "give" to ensure proper movement of the push rod 168 during operation.

The valve assembly 122 may further comprise a coil spring 178 that is mounted within a lower portion of the actuator housing 118 using an annular element 180. An insert 182 may be retained in the fluid body 116 by an O-ring 184. The annular element 180 and the insert 182 comprise an integral element, i.e., a cartridge body in the depicted aspect. An additional O-ring 186 seals the needle 176 such that pressurized material contained in a fluid bore 188 of the fluid body 116 does not leak out. Material is supplied to the fluid bore 188 from the syringe 20 through an inlet 190 of the fluid body 116 and passages 192, 194. The O-ring 184 seals the outside of the cartridge body formed by the annular element 180 and insert 182 from the pressurized liquid in fluid bore 188 and passage 194. A cross-drilled weep hole 185 is approximately in line with the lower end of the coil spring 178 to allow any liquid that leaks past the O-ring 186 to escape.

When the voltage waveform is applied to the stack 140, the piezoelectric elements deform, and the stack 140 expands or lengthens, causing the distal end 220 to move in a direction away from the proximal end 218 against the force exerted by the compression spring 144. The stack 140 may be configured to change length in proportion to the magnitude of the voltage waveform applied thereto over time. When the applied voltage is removed or sufficiently reduced, the stack 140 contracts or shortens to substantially the same length as it was before the application of the voltage.

The movement of the stack 140 causes movement of the push rod 168 operatively coupled to the piezoelectric device 126. The push rod 168 may be operatively coupled to a needle 176 disposed on the valve assembly 122. As the push rod 168 is moved, the needle 176 also moves to open or close a discharge outlet 204 on the valve assembly 122. Repeated movement of the stack 140 results in reciprocal movement of the needle 176 and causes droplets or small amounts of material to be dispensed or jetted through the discharge outlet 104 of the applicator 100.

Referring again to FIGS. 7-8, a mechanical amplifier 206 may be disposed within the applicator 100 to proportionally amplify the movement of the stack 140. The amplifier 206 is coupled to the stack 140 and to the valve assembly 122, such that movement of the stack 140 causes at least a portion of the amplifier 206 to move, which in turn causes the needle 176 to move. When the voltage waveform is applied to the stack 140, movement of the stack 140 imparts a force onto the amplifier 206 and causes the amplifier 206 to move as well and to move the needle 176. It will be appreciated that if amplification of the original movement is desired, the magnitude of the movement of the needle 176 by the amplifier 206 will be greater than the magnitude of the movement of the stack 140.

Figure 10:
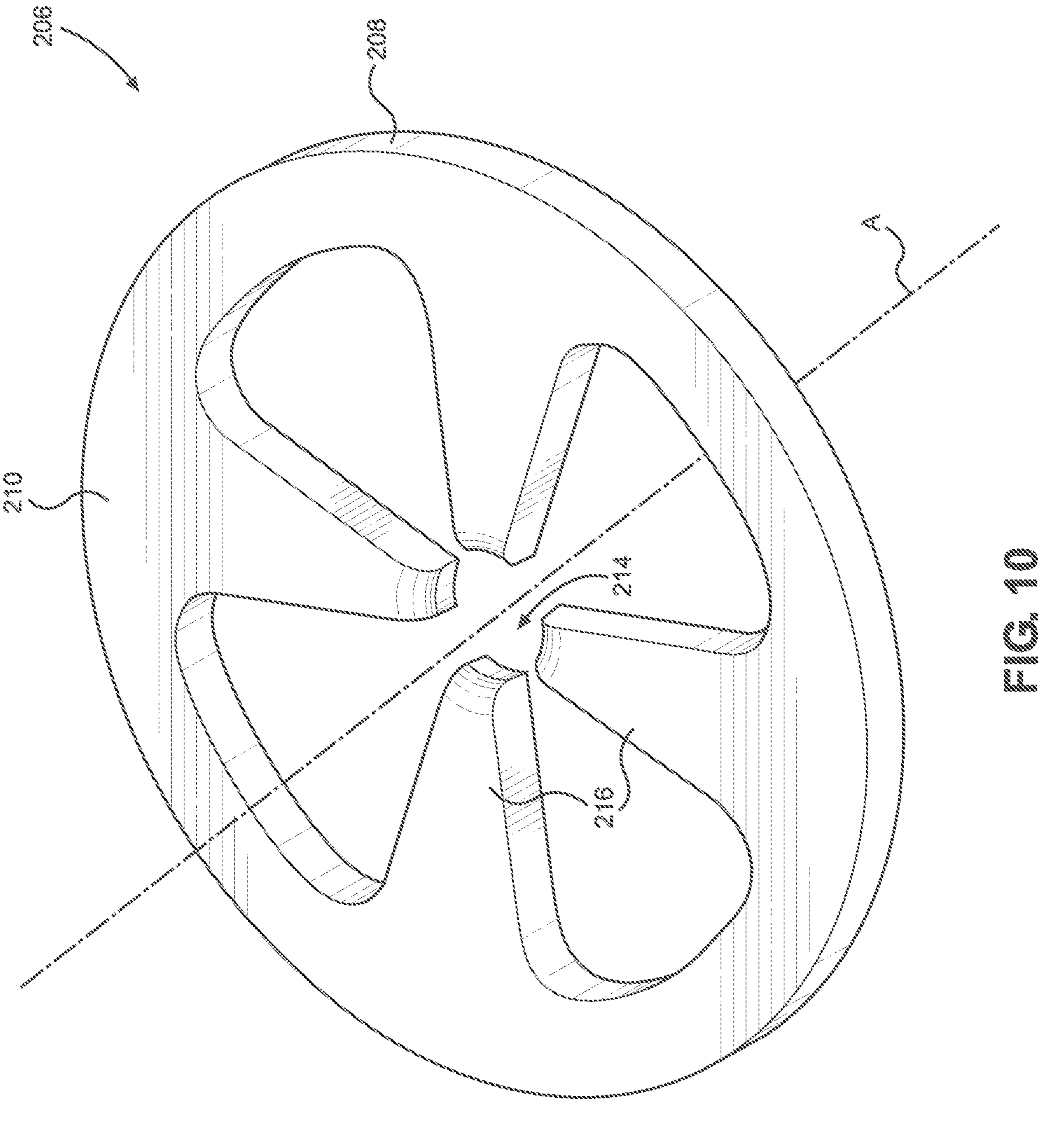
FIG. 10 is an isometric view of a mechanical amplifier of the valve assembly shown in FIG. 9A.
Figure 11:
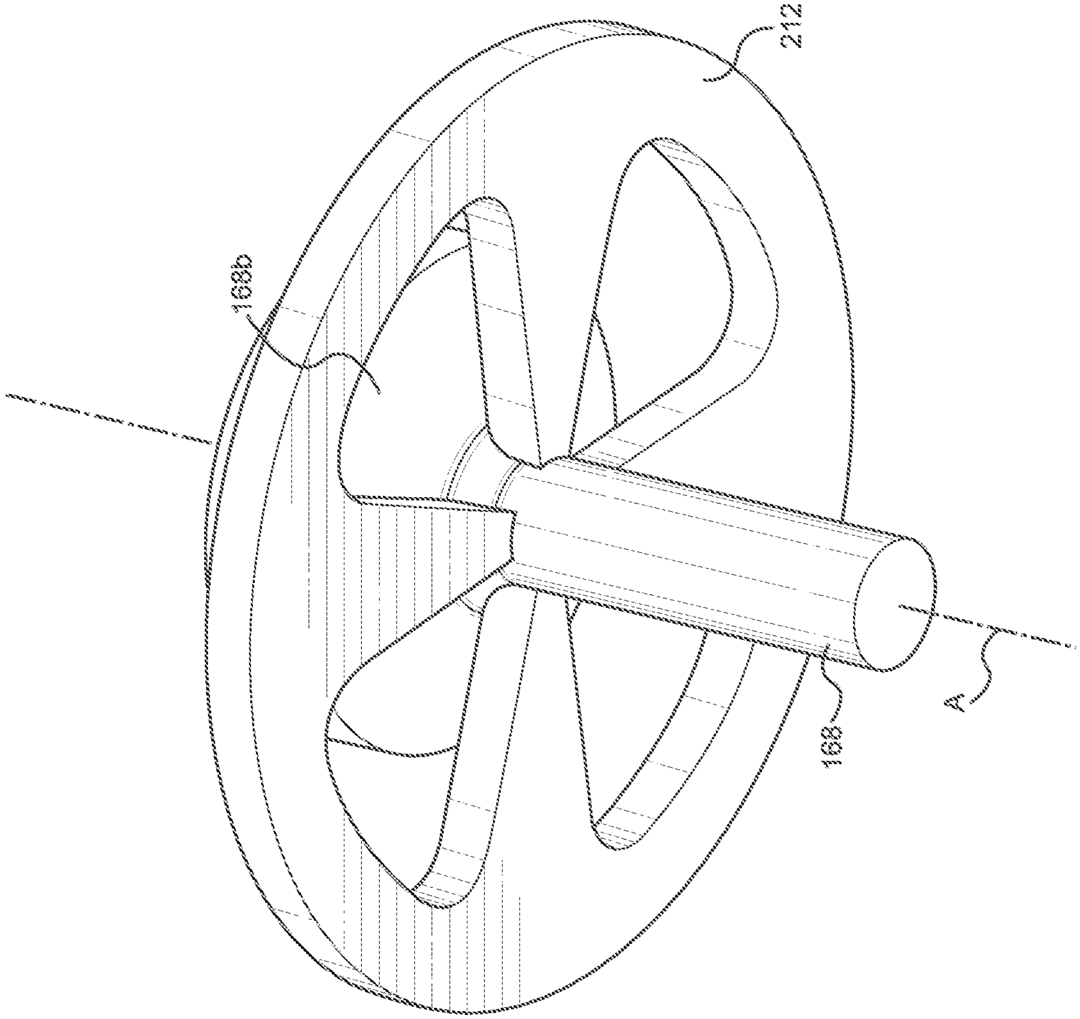
FIG. 11 is an alternative isometric view of the mechanical amplifier shown in FIG. 10.

Referring to FIGS. 10-11, the amplifier 206 may be a disc having a substantially round cross-section. However, it will be understood that the amplifier 206 may be any suitable shape, for example having rectangular, triangular, or another polygonal cross-sectional shape.

The amplifier 206 may be integral with the applicator 100, being either part of a single unitary component, or a separate component affixed to the applicator 100. In some aspects, the amplifier 206 may be a separate component that is removably coupled to the applicator 100 and is configured to be selectively engaged with or disengaged from the stack 140 and the valve assembly 122. The applicator 100 may be configured to operate either with an amplifier engaged or without an amplifier engaged. In some aspects, the applicator 100 may include a plurality of amplifiers 206 that can be selectively engaged or disengaged to result in varying degrees of amplification. The applicator 100 may be configured to operate with multiple amplifiers 206 simultaneously engaged. In some aspects, an amplifier 206 may be interchangeable with another amplifier 206 to result in a different degree of amplification.

Referring still to FIGS. 10-11, the amplifier 206 includes a body 208, which has a primary surface 210 and a secondary surface 212 opposite the primary surface 210. The body 208 may comprise a deformable material that can be deformed upon the application of force. The deformable material should be sufficiently resilient so that when the force that causes the deformation is reduced or removed, the body 208 returns substantially to its non-deformed shape. The body 208 should be rigid enough to receive a force from the stack 140 and to impart a force onto the needle 176 without sustaining damage (e.g., without cracking or breaking). It will be understood that no material is perfectly elastic and infinitely durable, and that a person skilled in the art would recognize materials that would perform the desired functions to an adequate degree.

The amplifier 206 may include an opening 214 extending through the body 208 and connecting the primary surface 210 with the secondary surface 212. A central axis A extends through the geometric center of the opening 214. The central axis A may also be common with the central axis of the stack 140 and the push rod 168. In some aspects, one or more lobes 216 may extend radially inward from a circumference of the body 208 into the opening 214 toward the central axis A. The lobes 216 may be substantially perpendicular to the central axis A when the amplifier 206 is not in a deformed configuration. The amplifier 206 may include 2, 3, . . . , 10, or another suitable number of lobes. Alternatively, the amplifier 206 may include zero lobes extending from the body 208 and be donut-shaped.

The amplifier 206 may be operatively coupled to the push rod 168, such that when the amplifier 206 is moved, the push rod 168 also moves. It will be understood that the push rod 168 can be coupled to the amplifier 206 in any suitable manner, for example, via friction fit, using an adhesive, using a fastener, etc. The push rod 168 may alternatively be integrally formed with the amplifier 206. Referring to the aspects depicted in FIG. 11, the push rod 168 may extend through the opening 214 of the amplifier body 208. In such aspects, at least a portion of the push rod 168 should be shaped and dimensioned such that it can freely pass through the opening 214. An upper head portion **168*b* of the push rod 168 may contact the amplifier 206, for example at the primary surface 210. The upper head portion 168*b* may be sized and dimensioned larger than the opening 214 such that it is prevented from passing through the opening 214. In some aspects, where the amplifier 206 is deformed, the opening 214 may be larger than it is when the amplifier 206 is not deformed. In such aspects, the upper head portion 168*b* should be sized to be larger than the opening 214 of the deformed amplifier 206** as well.

The upper head portion **168*b* is integrally attached to the portion of the push rod 168 that is configured to pass through the opening 214. The amplifier 206 may impart a force onto the upper head portion 168*b*, which is, in turn, transferred to the rest of the push rod 168**.

The amplifier 206 may operate as a lever mechanism to receive a force from the stack 140 and to impart a force onto the push rod 168. The amplifier 206 may be disposed between the distal end 220 of the piezoelectric device 126 and a base 230. Referring again to FIGS. 7-8, the primary surface 210 may be adjacent to the distal end 220, while the secondary surface 212 may be adjacent to the base 230.

In some aspects, to increase precision of the force transfer, the amplifier 206 is contacted by specific contact regions disposed on the distal end 220 and the base 230. As shown in FIG. 8, for example, a primary protrusion 222 may be disposed on the distal end 220 and extend therefrom in a direction toward the primary surface 210 of the amplifier 206. Similarly, the base 230 may include a secondary protrusion 232 that extends therefrom in a direction toward the secondary surface 212 of the amplifier 206. While the primary protrusion 222 and the secondary protrusion 232 may extend from the distal end 220 and the base 230, respectively, at any acceptable angle, it will be understood that at least a component of the angle of extension should be substantially perpendicular to the primary and secondary surfaces 210, 212, respectively.

In some alternative aspects, the primary protrusion 222 may be integral to and extend from the primary surface 210 of the amplifier body 208 toward the distal end 220. Similarly, the secondary protrusion 232 may be integral to and extend from the secondary surface 212 of the amplifier body 208 toward the base 230. In further aspects, protrusions may extend from one or more of the amplifier 206, the distal end 220, and/or the base 230, and this disclosure is not limited to a particular arrangement of protrusions as described above.

In operation, the applicator 100 is configured to jet droplets or small amounts of material, where the material is provided from the syringe 20, which is attached to the fluid body 116 (the syringe 20 will be described in detail below). When the stack 140 is activated, i.e., when a voltage waveform is applied to the piezoelectric elements by the main electronic control (not shown), the stack 140 expands and pushes against the amplifier 206 at the primary surface 210. Based on the position of the primary and secondary protrusions 222, 232 as described above, the amplifier 206 deforms and imparts a force onto the upper head portion **168*b* of the push rod 168. This forces the push rod 168 to move in an opening direction toward the piezoelectric device 126. The distance the upper head portion 168*b* is moved by the amplifier 206 is preferably greater than the distance moved by the distal end 220 of the stack 140. The lower head portion 168*a*, integral to the push rod 168, also moves in the same opening direction. As the lower head portion 168*a* moves away from the needle 176, the needle 176 is also permitted to move in the opening direction to a first position. The needle 176 may be biased toward the opening direction by a coil spring 178, and when the push rod 168 moves away from the needle 176, the coil spring 178 moves the needle 176** in the opening direction as well.

When voltage is removed or sufficiently reduced from the stack 140, the movements described above are reversed. The stack 140 is reduced in length, thus decreasing the force applied to the amplifier 206. The amplifier 206 may then return to its substantially non-deformed state, which in turn decreases the force applied onto the upper head portion 168*b* of the push rod 168. The push rod 168 may be biased by a coil spring 169 in a closing direction opposite the opening direction. As the force applied by the amplifier 206 onto the push rod 168 is reduced below the biasing force of the coil spring 169, the coil spring 169 moves the push rod 168 in the closing direction. The lower head portion 168*a* contacts the proximal end 176*a* of the needle 176 and pushes the needle 176 in the closing direction against the force of the coil spring 178 until a distal end 176*b*, disposed on the needle 176 opposite the proximal end 176*a*, engages against a valve seat 200 in a second position spaced from the first position. The coil spring 178 may have a lower stiffness than the coil spring 169 such that, absent external forces, the force exerted by the coil spring 169 in the closing direction is greater than the force exerted by the coil spring 178 in the opening direction.

In the process of moving the needle 176 from the first position to the second position, the distal end 176*b* of the needle 176 may force a droplet 202 of material from the discharge outlet 204 when the distal end 176*b* strikes the valve seat 200 of the discharge outlet 204. Additionally, during this dispensing operation, the applicator 100 can monitor the movement of one of the moving parts of the system. To do this, the applicator 100 can include a reference component 148 attached to the push rod 168 at the upper head portion 168*b*, as well as a position sensor 150 disposed within the actuator housing 118. The position sensor 150 is configured to detect and monitor the position of the reference component 148 as the push rod 168 moves upwards and downwards upon lengthening and contraction of the piezoelectric stack 140. The position sensor 150 is in electronic communication with the controller 14, and can continuously or periodically monitor and communicate the position of the reference component 148 to the controller 14. By monitoring the position of the reference component 148, the position sensor 150 also monitors the position of the mechanical amplifier 206 with which it is in contact during a dispensing operation. In one embodiment, the reference component 148 is a magnet and the position sensor 150 is a Hall effect sensor, though other configurations are also contemplated. Also, although the reference component 148 is depicted as attached to the push rod 168, the reference component 148 can be attached to any of the mechanical amplifier 206, the push rod 168, or the needle 176. The mechanical amplifier 206, push rod 168, and the needle 176 can collectively be referred to as the moving parts of the actuator. As the reference component 148 can be differently positioned, the position sensor 150 can similarly be repositioned within the actuator housing 118 so as to best monitor the position of the reference component 148. The method for using the reference component 148 and position sensor 150 to control the applicator 100 will be described further below.

It will be appreciated that the piezoelectric device 126 may be utilized in reverse to jet droplets. In this case, the various mechanical actuation structures may be designed differently such that when the voltage waveform is applied to the stack 140, the resulting expansion of the stack 140 causes movement of the needle 176 toward the valve seat 200 and causes the discharge outlet 104 to discharge a droplet 102 of material. Then, upon removal of the voltage to the stack 140, the amplification system and other actuation components would raise the needle 176 in order to charge the fluid bore 188 with additional material for the next jetting operation. In such aspects, the needle 176 would be normally open, i.e., not engaging the valve seat 200 when there is no voltage applied to the stack 140.

The amount of deformation of the amplifier 206 and, as a result, the degree of amplification of the movement of the stack 140 is determined, in part, by the relative positioning of the primary and secondary protrusions 222, 232 as they contact the primary and secondary surfaces 210, 212, respectively. When the voltage waveform is applied to the stack 140, the stack 140 lengthens and moves the distal end 220 to apply a force to the amplifier 206. The primary protrusion 222 at the distal end 220 may contact the primary surface 210 of the amplifier 206 at a first distance D1 away from the central axis A that extends through the geometric center of the amplifier 206. The base 230 is disposed on the other side of the amplifier 206 such that it is configured to contact the secondary surface 212. A secondary protrusion 232 may contact the secondary surface 212 at a second distance D2 away from the central axis A. To create a suitable lever action to amplify the distance moved by the distal end 220, the first distance D1 and the second distance D2 should be different.

Figure 12:
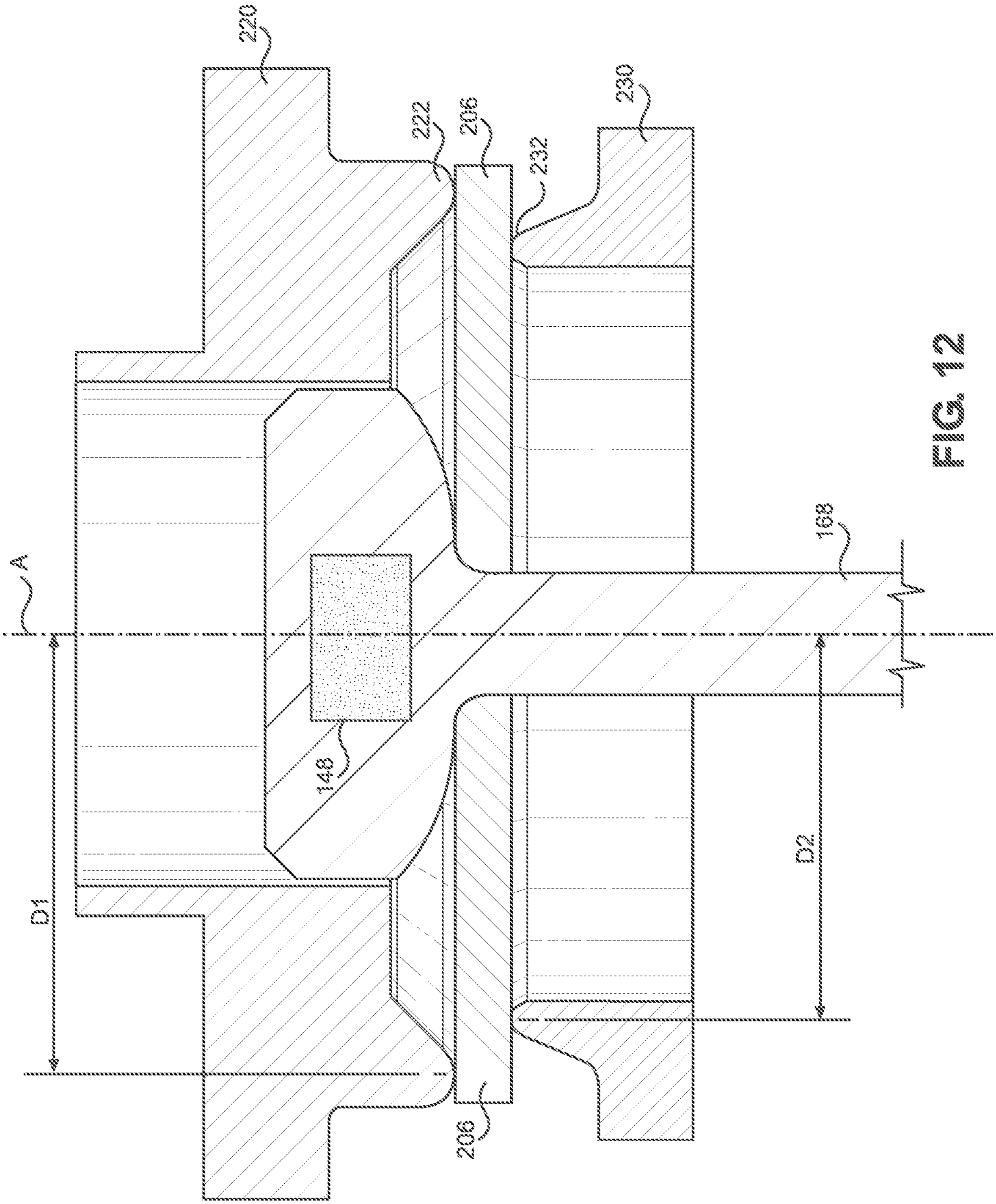
FIG. 12 is a cross-sectional view of the mechanical amplifier shown in FIG. 10, with the mechanical amplifier in an un-deformed configuration.
Figure 13:
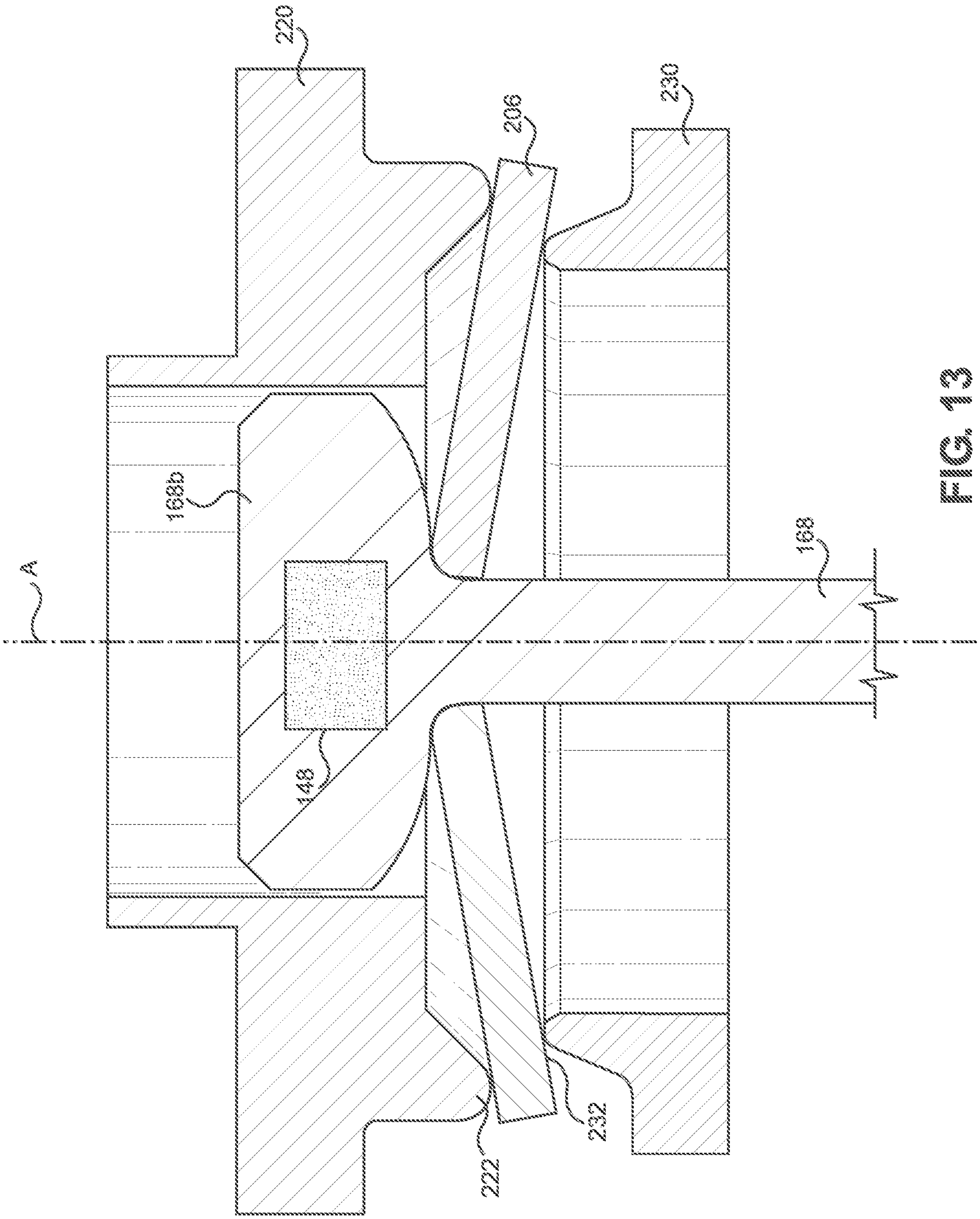
FIG. 13 is a cross-sectional view of the mechanical amplifier shown in FIG. 10, with the mechanical amplifier in a deformed configuration.

Referring to FIGS. 12-13, the first distance D1 may be greater than the second distance D2. When force is applied to the primary surface 210 by the primary protrusion 222, the secondary protrusion 232 acts as a fulcrum. Thus, as a portion of the amplifier 206 that is farther from the central axis A than the second distance D2 is pushed in one direction (e.g., downward) by the primary protrusion 222, another portion of the amplifier 206 that is closer to the central axis A than the second distance D2 is levered in an opposite direction (e.g., upward). The push rod 168 that is operatively coupled with the amplifier, e.g., at the interaction of the primary surface 210 or the lobes 216 and the upper head portion 168*b*, is thus moved in the same direction. FIG. 13 depicts an exemplary aspect where the stack 140 is lengthened and a force is applied onto the primary surface 210 of the amplifier 206. The amplifier 206 is thus deformed, and the upper head portion 168*b*, along with the rest of the push rod 168, is moved axially along the central axis A.

Figure 14:
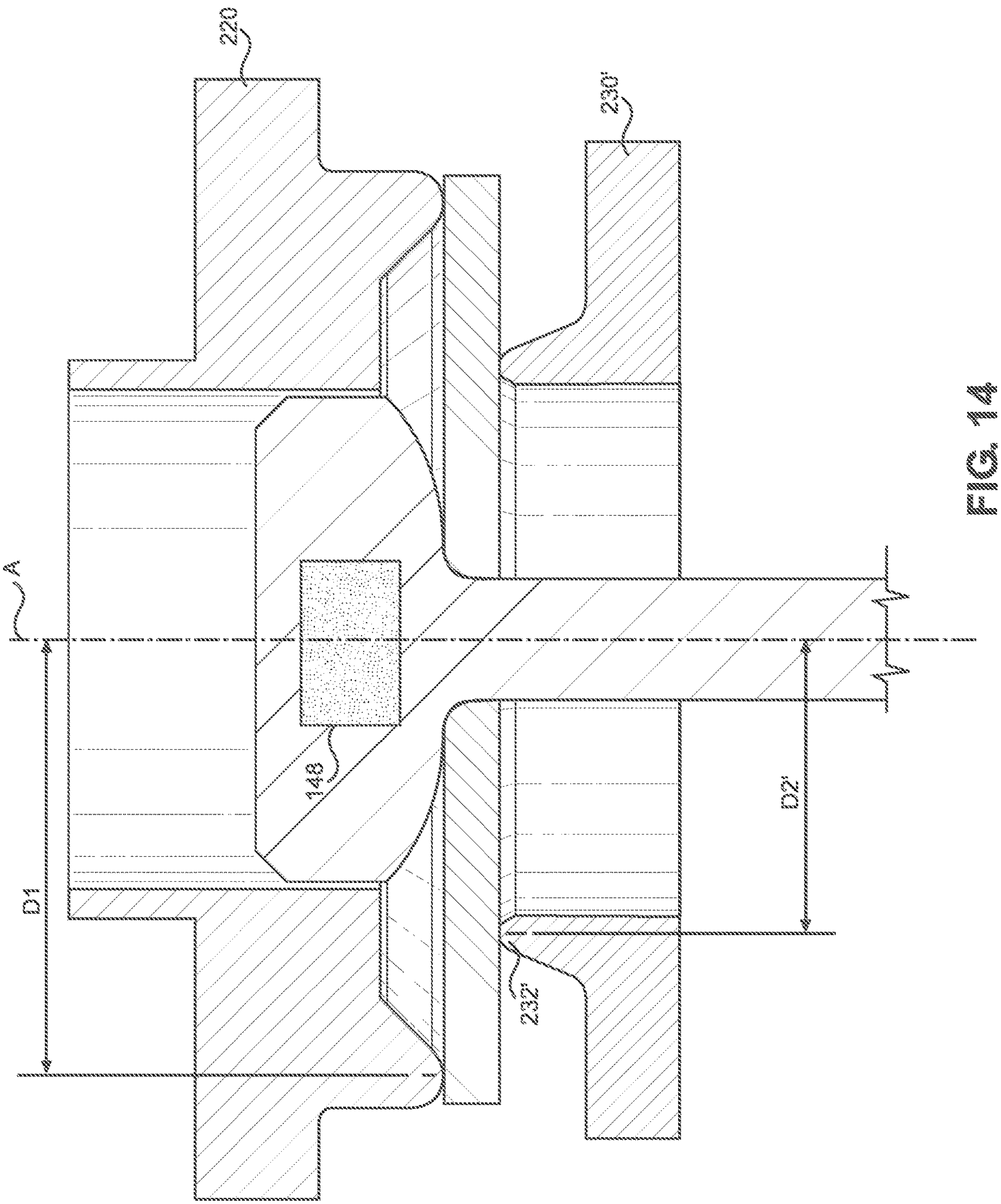
FIG. 14 is a cross-sectional view of the mechanical amplifier shown in FIG. 10, with the valve assembly in an alternative configuration.

The distance that the push rod 168 moves depends on the first and second distances D1, D2. As the second distance D2 increases (i.e., as the fulcrum gets farther from the central axis A), the distance that the push rod 168 moves will also increase. The amount of amplification may be controlled by increasing or decreasing the second distance D2. FIG. 14, for example, depicts an alternative embodiment including a base 230' having a secondary protrusion 232' that is disposed at a second distance D2' away from the central axis A. The second distance D2' is smaller than the second distance D2. As such, in an embodiment having base 230', the push rod 168 will move a smaller distance than it would in an aspect utilizing the base 230, resulting in a smaller comparable amplification (taking all other factors as equal).

While changing the second distance D2 is a suitable method of adjusting the amount of amplification, amplification may be changed in a variety of ways. In some aspects, the amplifier 206 may include a material that is configured to deform more easily (e.g., the material is softer or more elastic) or a material configured to be more rigid (e.g., the material is stiffer or less elastic). The thickness of the body 208 may be increased (to increase rigidity) or decreased (to increase pliability). In some aspects, the lobes 216 may be changed in thickness, material properties, and/or length (i.e., distance the lobes 216 extend from the body 208 to the central axis A).

The body 208 of the amplifier 206 may have a varying thickness (i.e., the distance between the primary surface 210 and the secondary surface 212) therethrough. In some aspects, for example, the body 208 may be at a maximum thickness farthest away from the opening 214 and at a minimal thickness closest to the opening 214, with the thickness gradually decreasing from the maximum to the minimum thickness. Alternatively, the body 208 may include one or more steps (not shown), each step having a different thickness, where, for example, the step farthest from the opening 214 is at the maximum thickness and the step closest to the opening 214 is at the minimum thickness.

Figure 15:
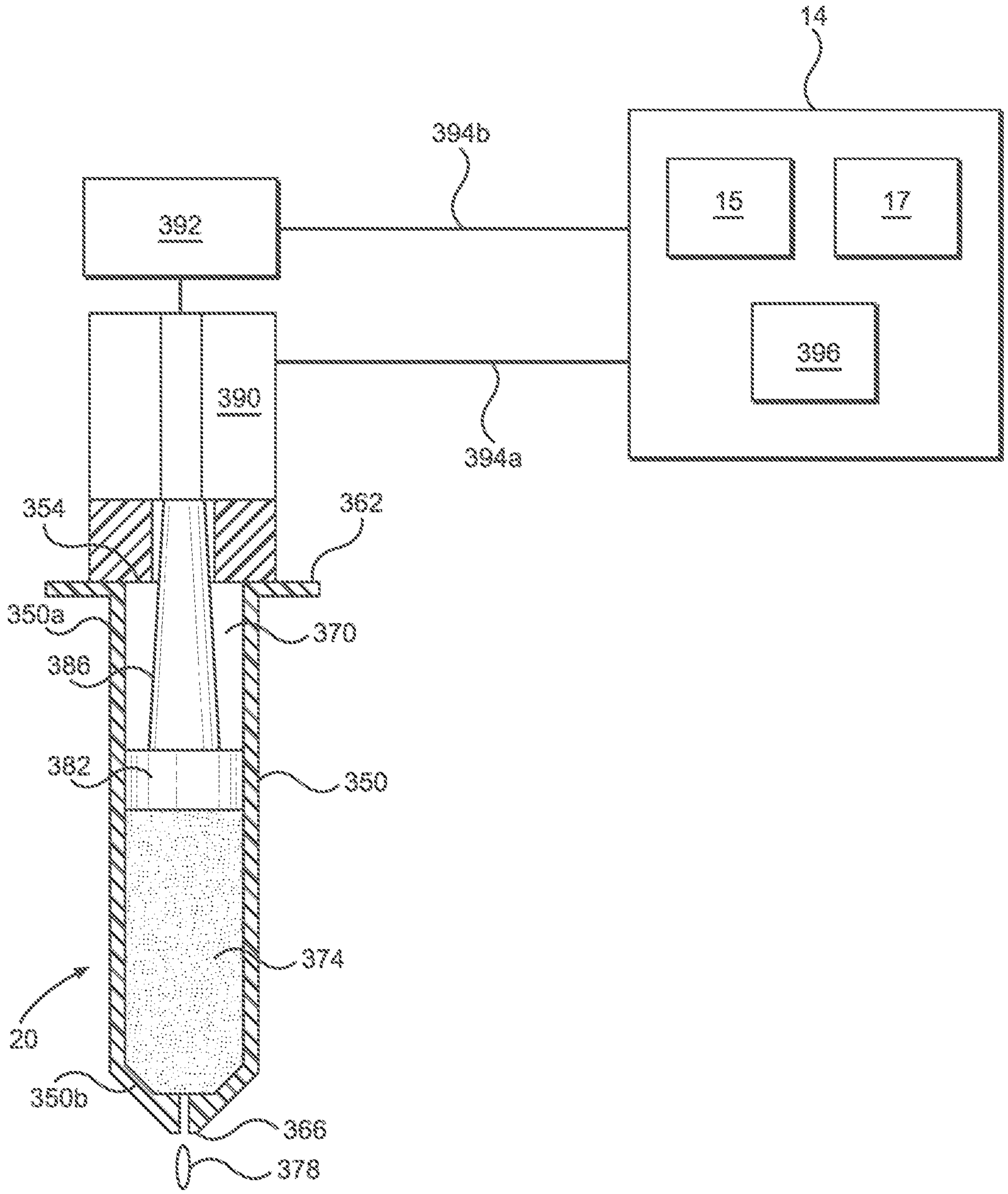
FIG. 15 is a schematic diagram of a portion of the applicators shown in FIGS. 1-14.

Now referring to FIG. 15, the syringe 20 and related components will be discussed in greater detail. The syringe 20 can comprise a body 350 that extends between a first end 350*a* and a second end 350*b* opposite the first end 350*a*. The body 350 can define a substantially cylindrical cross-sectional shape throughout its length, though other embodiments are contemplated. The body 350 can also define a substantially constant diameter from the first end 350*a* through a substantial majority of the second end 350*b*, though the body 350 can taper inwards over a portion of the second end 350*b*. However, the present disclosure is not intended to be limited to this embodiment. The second end 350*b* can include an attachment portion 366 that is configured to be releasably attached to a portion of the fluid body 16, 116. The body 350 can define a chamber 370 therein that extends from the first end 350*a* to the second end 350*b*, where the chamber 370 is configured to receive and store an amount of material 374*a*. The material 374 can be a lubricant, adhesive, epoxy, or a biomaterial, though the present disclosure is not intended to be limited to these examples. A flange 362 can extend circumferentially outwards from the first end 350*a* of the body 350, where the flange 362 can allow for manual actuation of the plunger 386 of the syringe 20 by the system operator, where the plunger 386 and piston 382 will be described further below.

The body 350 can also define an inlet 354 located at the first end 350*a* of the body 350 and an outlet 358 opposite the inlet 354 and located at the second end 350*b* of the body 350, where the chamber 370 extends from the inlet 354 to the outlet 358. The chamber 370 can be configured to receive a piston 382, where the piston 382 is disposed within the chamber 370 and configured to linearly translate through the chamber 370. The piston 382 can comprise a metallic or plastic material, and can define a cross-section that is substantially identical in shape and size to that of the chamber 370 so as to prevent migration of any material 374 past the piston 382 during a dispensing operation. The syringe 20 can also include a seal (not shown), such as an O-ring, disposed around the piston 382 so as to further prevent migration of the material 374 past the piston 382. A plunger 386 can be attached, either monolithically, integrally, or releasably, to the piston 382. The plunger 386 can be configured to move with the piston 382 through the chamber 370 while the piston 382 dispenses a discrete volume 378 of the material 374 through the outlet 358 of the syringe 20. The discrete volume 378 can be defined as a discrete quantity of the material 374, and can range in quantity from a single droplet to a prolonged stream of the material 374.

To linearly translate the piston 382 through the chamber 370, the applicator 10, 100 can include an actuation mechanism 390. The actuation mechanism 390 can be a pneumatic actuator in fluid communication with the chamber 370, and thus the piston 382. The actuation mechanism 390 can be configured to apply pneumatic pulses through the chamber 370 and directly onto the piston 382 in a pulse pressure dispensing operation. Alternatively, the actuation mechanism can apply a constant pressure onto the piston 382. However, other types of actuation mechanisms other than pneumatic actuators are also contemplated. The actuation mechanism 390 can be in signal communication with the controller 14 through the signal connection 394*a*, such that the controller 14 is capable of controlling operation of the actuation mechanism 390, as will be discussed further below. The signal connection 394*a* can comprise a wired and/or wireless connection. The actuation mechanism 390 can be configured to linearly translate the piston 382, and likewise the plunger 386, through the chamber 370 so as to dispense discrete volumes 378 from the syringe 20 having known (and consistent) sizes, shapes, and volumes. However, such consistent dispensing can become difficult as a dispensing operation goes on. For example, the properties of the material 374 can change over time, which may require changing the operation of the actuation mechanism 390 so to ensure the discrete volume 378 maintains consistent.

To ensure that the characteristics of the dispensed material 374 maintain consistency, the applicator 10, 100 can include a sensor 392 attached to the plunger 386. The sensor 392 can be configured to sense a linear movement of the plunger 386, and thus the linear movement of the piston 382, as the piston 382 and the plunger 386 move through the chamber 370 of the syringe 20. The sensor 392 can be a linear position transducer, linear voltage displacement transducer (LVDT), laser, or absolute linear encoder, though other types of conventional position sensors are contemplated. The sensor 392 can be in signal communication with the controller 14 through signal connection 394*b*, such that the controller 14 can receive a signal indicative of the linear movement of the plunger 386. Signal connection 394*b* can comprise a wired and/or wireless connection. As a result, the controller 14 can be configured to adjust operation of the actuation mechanism 390, which adjusts movement of the piston 382, based on the linear movement sensed by the sensor 392 when the linear movement sensed by the sensor 392 does not match the movement required to produce a discrete volume 378 having the required volume. Because of this feedback, the controller 14 can ensure that the piston 382 consistently and repeatedly dispenses a predetermined amount of the material 374 from the outlet 358 of the syringe 20 over a plurality of dispense cycles. The adjustment performed by the controller 14 can be done automatically, or can be done upon receiving a prompt from the operator via the HMI device 17. Each dispense cycle can be defined as the dispensing of a single discrete volume 378 of the material 374. Before utilizing the information received from the sensor 392, the signal provided through the signal connection 394*b* can be processed by an amplifier 396. The amplifier 396 can be part of the controller 14 as depicted, or can be a separate component from the controller 14. Additionally, an operator of the applicator 10, 100 can input the required volume of the discrete volume 378 and the starting position of the piston 382 to define the initial parameters of the dispensing operation.

The linear movement utilized to adjust movement of the piston 382 may not be a single linear movement of the plunger 386, but can be the average magnitude of a plurality of linear movements sensed during respective ones of the plurality of dispense cycles. In other words, the controller 14 can sense the linear movement of the plunger 386 over time as the piston 382 performs a variety of dispensing cycles, store this information in the memory 15, and average the magnitude of the linear movements for each dispense cycle for use in adjusting operation of the actuation mechanism 390 and movement of the piston 382 so as to repeatedly dispense the predetermined amount of material 374. In one embodiment, the plurality of dispense cycles that this average can be taken over is 50 dispense cycles. However, other numbers of dispense cycles am contemplated. Optionally, the operator of the applicator 10, 100 can manually input a quantity for the plurality of dispense cycles through the HMI device 17. By using an average of the linear movement over a plurality of dispense cycles rather than a single linear movement after one dispense cycle to control operation of the actuation mechanism 390, the controller 14 can account for and effectively negate any non-repeatable irregularities that occurred during a single dispense cycle, while still accounting for various changing conditions over time within the chamber 370 of the syringe 20. The controller 14 can use this average in an algorithm to characterize the movement pattern of the plunger 386 through the chamber 370 over time so as to ensure that the size of the discrete volume 378 dispensed from the outlet 358 by the piston 382 remains consistent.

The average linear movement described above may not be the average of a static number of linear movements. For example, the average may define a moving average, such that the average of the plurality of linear movements of the plunger 386 is the average of the immediately preceding plurality of linear movements. When the average comprises the average of the linear movements for 50 dispense cycles, the average can comprise the average of the linear movements for the 50 dispense cycles immediately preceding the dispense cycle that the actuation mechanism 390 is moving the piston 382 for. When the average comprises a moving average, the average must inherently be recalculated over time. For example, the moving average can be recalculated after each dispense cycle, or the average can be recalculated after a set interval of dispense cycles. In one embodiment, the interval can be every 10 dispense cycles. In another embodiment, the controller 14 can adjust the operation of the actuation mechanism 390 and movement of the piston 382 every 20 dispense cycles based on the average of the instantaneous position over the previous 100 dispense cycles. However, the present disclosure contemplates that the controller 14 can average the instantaneous position of the plunger 386 over various different numbers of dispense cycles and at various intervals of dispense cycles, as selected by the operator via the HMI device 17 or as automatically determined by the controller 14.

The controller 14 may adjust operation of the actuation mechanism 390 so as to alter movement of the piston 382 whenever the magnitude of a sensed linear movement or average magnitude of a plurality of linear movements of the plunger 386 do not match an intended linear movement. Alternatively, the controller 14 may adjust operation of the actuation mechanism 390 only when the magnitude of the sensed linear movement or average magnitude of a plurality of linear movements of the plunger 386 is outside a predetermined range. This range may comprise a linear range or percentage deviation from the intended magnitude. This range may be automatically calculated by the controller 14 based upon factors such as the type of material 374 within the syringe 20, the type of dispense operation being performed, the size of the discrete volume 378 to be dispensed, etc. Alternatively, the range may be provided to the controller 14 by the operator through the HMI device 17 based upon a range of linear movements that will still produce a discrete volume 378 having a size that meets the requirements of the particular dispensing operation.

Over time, the controller 14 can also track the total linear movement that the plunger 386 has experienced as the piston 382 advances through the chamber 370 of the syringe 20. From the total linear movement, the controller 14 can calculate the total amount of the material 374 that has been forced from the chamber 370 by the piston 382. This total remaining amount of material 374, and optionally the total amount of material dispensed, can be displayed via the HMI device 17 for the operator's reference. As a result, the operator can be constantly aware of how full the chamber 370 of the syringe 20 is, and can be prepared for when the syringe 20 empties and must be replaced. Additionally, the controller 14 can automatically report to the operator when the syringe 20 is empty and must be replaced.

Figure 16:
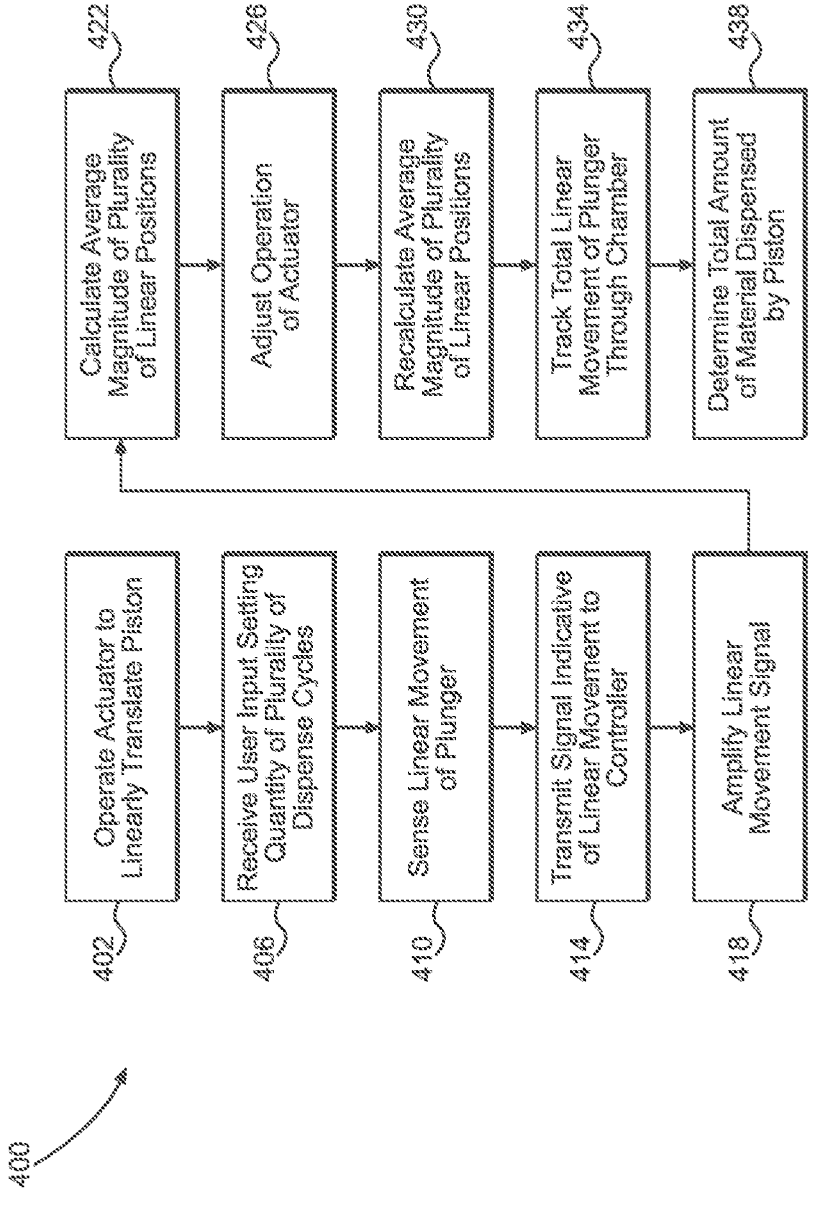
FIG. 16 is a process flow diagram of a method of dispensing material from the syringe according to an embodiment of the present disclosure.

Continuing with FIG. 16, a method 400 of dispensing material from the syringe 20 will be described. The method 400 includes step 402, in which the actuation mechanism 390 is actuated to linearly translate the piston 382 and the plunger 386 attached thereto through the chamber 370 of the syringe 20 so as to dispense material 374 through the outlet 358 of the syringe 20. This step can be performed by the controller 14, which can direct the actuation mechanism 390 to linearly translate the piston 382. Then, in step 406, the HMI device 17 can receive a user input that sets the quantity for the plurality of dispense cycles that the magnitude of linear movement will be averaged over. Alternatively, this quantity can be determined by the controller 14 or recalled from the memory 15. After step 406, the sensor 392 can sense the linear movement of the plunger 386, and thus the piston 382, over a plurality of dispense cycles in step 410.

Once the sensor 392 senses the linear movement of the plunger 386 in step 410, the sensor 392 can transmit a signal indicative of the linear movement to the controller 14 in step 414. This signal can be transmitted through the signal connection 394*b*, which can be a wired and/or wireless connection. Then, in step 418 the amplifier 396 can amplify the linear movement signal provided to the controller 14. Then, in step 422, the controller 14 can calculate an average magnitude of the plurality of linear movements during respective ones of the plurality of dispense cycles. As stated above, the number of dispense cycles this average magnitude can be taken over can be 50 dispense cycles. However, this quantity of dispense cycles can vary, and can be adjusted by the controller 14 or through input into the HMI device 17 by the operator of the applicator 10, 100. Then, in step 426, the controller 14 can compare the sensed linear movement to an ideal or predetermined linear movement required to produce a discrete volume 378 having specific properties and adjust the operation of the actuator 390 movement of the piston 382 based on the linear movement sensed by the sensor 392, if required. This is done to ensure that the piston 382 repeatedly dispenses a predetermined amount of material 374 from the outlet 358 of the syringe 20 over a plurality of dispense cycles.

The adjustment can be based upon the average magnitude of the plurality of linear movements determined in step 422. The adjustment can be made if the instantaneous or average linear movement of the plunger 386 differs from the predetermined linear movement. Alternatively, the adjustment can be made if the instantaneous linear movement is outside a predetermined range. This range may comprise a linear range or percentage deviation from the intended magnitude. This range may be automatically calculated by the controller 14 based upon factors such as the type of material 374 within the syringe 20, the type of dispense operation being performed, the size of the discrete volume 378 to be dispensed, etc. Alternatively, the range may be provided to the controller 14 by the operator through the HMI device 17.

After the adjustment is made in step 426, in step 430 the controller 14 can recalculate the average magnitude of the plurality of linear movements. This can be done at regular intervals, at discrete benchmarks in material dispensing, or at the instruction of the operator. This allows the average magnitude to comprise a moving average, such that the average magnitude of the plurality of linear movements utilized by the controller 14 at any time is the average of the immediately preceding plurality of linear movements. In one embodiment, the interval is every 10 dispense cycles, though various other intervals are contemplated.

The controller 14 can also be configured to track the total linear movement of the plunger 386 through the chamber 370 of the syringe 20 in step 434. Using this information, in step 438 the controller 14 can determine the total amount of material dispensed by the piston 382 from the syringe 20. This total dispensed amount, and/or the inverse amount of material 374 left within the chamber 370, can be displayed via the HMI device 17 to keep the operator constantly informed of conditions within the syringe 20.

Controlling the movement of a piston 382 to dispense material 374 from the syringe 20 using the feedback from the sensor 392 as described above has several advantages. Using this method of dispensing, variation of the discrete volume 378 dispensed from the syringe 20 can be kept to a minimum. Further, in contrast to known feedback systems, correction of volume variations can be accounted for regardless of their source. Feedback control of plunger movement using the sensor 392 described above has the flexibility of being compatible with both pulse-pressure and valve dispensing systems. Additionally, the above-described system and method for piston movement control has the benefit of being cost-effective, user-friendly, and provides the ability to be set up by the end user without requiring additional calibration, in contrast to other feedback systems.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts, and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features, and concepts may be expressly identified herein as being inventive or forming part of an invention, such identification is not intended to be exclusive, but rather there may be inventive aspects, concepts, and features that are fully described herein without being expressly identified as such or as part of a specific invention, the scope of the inventions instead being set forth in the appended claims or the claims of related or continuing applications. Descriptions of exemplary methods or processes are not limited to inclusion of all steps as being required in all cases, nor is the order that the steps are presented to be construed as required or necessary unless expressly so stated.

While the invention is described herein using a limited number of embodiments, these specific embodiments are not intended to limit the scope of the invention as otherwise described and claimed herein. The precise arrangement of various elements and order of the steps of articles and methods described herein are not to be considered limiting. For instance, although the steps of the methods are described with reference to sequential series of reference signs and progression of the blocks in the figures, the method can be implemented in a particular order as desired.

What is claimed is:

1. An applicator for dispensing material, the applicator comprising:
- a syringe defining an inlet, an outlet, and a chamber extending from the inlet to the outlet;
- a piston disposed within the chamber;
- a plunger attached to the piston, wherein the piston is configured to move with the plunger through the chamber;
- an actuation mechanism configured to linearly translate the piston through the chamber so as to dispense material through the outlet;
- a sensor attached to the plunger, wherein the sensor is configured to sense a plurality of linear movements of the plunger; and
- a controller configured to adjust operation of the actuation mechanism based on an average magnitude of the plurality of linear movements sensed by the sensor during respective ones of a plurality of dispense cycles, such that the piston repeatedly dispenses a predetermined amount of the material from the outlet of the syringe over the plurality of dispense cycles.

2. The applicator of claim 1, wherein the plurality of dispense cycles comprises 50 dispense cycles.

3. The applicator of claim 1, wherein the controller includes a human-machine interface configured to receive a user input that determines a quantity for the plurality of dispense cycles.

4. The applicator of claim 1, wherein the average magnitude of the plurality of linear movements is a moving average, such that the average magnitude of the plurality of linear movements at any time is an average magnitude of an immediately preceding plurality of linear movements.

5. The applicator of claim 1, wherein the controller is configured to adjust operation of the actuation mechanism when the linear movement is outside a predetermined range.

6. The applicator of claim 1, wherein the sensor is a linear position transducer.

7. The applicator of claim 1, wherein the controller is configured to adjust operation of the actuation mechanism automatically.

8. The applicator of claim 1, wherein the controller includes an amplifier configured to process a signal that is indicative of the linear movement.

9. The applicator of claim 1, wherein the controller is configured to track a total linear movement of the plunger through the chamber.

10. The applicator of claim 1, further comprising:
- a valve assembly including a valve seat and a needle configured to translate between a first position, where the needle is spaced from the valve seat, and a second position, where the needle contacts the valve seat, in a dispensing operation for jetting material from the valve assembly; and a piezoelectric device for moving the needle in response to receiving a voltage, wherein the syringe is configured to provide the material to the valve assembly.

11. The applicator of claim 1, wherein the actuation mechanism is a pneumatic actuator.

12. A method of dispensing material from a syringe, the method comprising:

operating an actuation mechanism to linearly translate a piston and a plunger attached thereto through a chamber of the syringe so as to dispense material through an outlet of the syringe;

sensing a plurality of linear movements of the plunger via a sensor;

calculating an average magnitude of the plurality of linear movements during respective ones of a plurality of dispense cycles; and adjusting operation of the actuation mechanism based on the average magnitude of the plurality of linear movements sensed by the sensor such that the piston repeatedly dispenses a predetermined amount of the material from the outlet of the syringe over the plurality of dispense cycles.

13. The method of claim 12, wherein the plurality of dispense cycles comprises 50 dispense cycles.

14. The method of claim 12, further comprising:

recalculating the average magnitude of the plurality of linear movements at regular intervals, such that the average magnitude of the plurality of linear movements at any time is an average magnitude of an immediately preceding plurality of linear movements.

15. The method of claim 12, wherein the adjusting operation of the actuation mechanism comprises adjusting the operation of the actuation mechanism when the linear movement is outside a predetermined range.

16. The method of claim 12, wherein adjusting the operation of the actuation mechanism comprises automatically adjusting the operation of the actuation mechanism via a controller.

17. The method of claim 12, further comprising:

transmitting a signal indicative of the linear movement to a controller; and amplifying the signal.

18. The method of claim 12, further comprising:

tracking a total linear movement of the plunger through the chamber.

19. The method of claim 12, wherein the piston progressively advances through the chamber along a first direction over the plurality of dispense cycles, whereby each linear movement of the plurality of linear movements of the plunger is along the first direction.

20. The applicator of claim 1, wherein the piston is configured to progressively advance through the chamber along a first direction over the plurality of dispense cycles, whereby each linear movement of the plurality of linear movements of the plunger is along the first direction.

* * * * *